US009862609B2

(12) United States Patent
Deemer et al.

(10) Patent No.: US 9,862,609 B2
(45) Date of Patent: Jan. 9, 2018

(54) COMPOSITIONS AND METHODS RELATED TO DOPED GRAPHENE DERIVED FROM ASPHALTENES

(71) Applicant: Board of Regents, The University of Texas System, Austin, TX (US)

(72) Inventors: Eva M. Deemer, El Paso, TX (US); Russell R. Chianelli, El Paso, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 2 days.

(21) Appl. No.: 14/960,324

(22) Filed: Dec. 4, 2015

(65) Prior Publication Data

US 2016/0304350 A1 Oct. 20, 2016

Related U.S. Application Data

(60) Provisional application No. 62/087,695, filed on Dec. 4, 2014.

(51) Int. Cl.
| | | |
|---|---|---|
| *C01B 31/04* | (2006.01) | |
| *H01B 1/04* | (2006.01) | |
| *B82Y 40/00* | (2011.01) | |
| *B82Y 30/00* | (2011.01) | |

(52) U.S. Cl.
CPC .......... *C01B 31/0446* (2013.01); *H01B 1/04* (2013.01); *B82Y 30/00* (2013.01); *B82Y 40/00* (2013.01); *Y10S 977/734* (2013.01); *Y10S 977/842* (2013.01)

(58) Field of Classification Search
CPC ............ C01B 31/0446; C01B 31/0484; C25B 11/0447; B82Y 30/00; B82Y 40/00; Y10S 977/734; Y10S 977/842; H01F 1/0306
See application file for complete search history.

(56) References Cited

U.S. PATENT DOCUMENTS

2012/0228555 A1* 9/2012 Cheng .................... B82Y 30/00
252/503

OTHER PUBLICATIONS

Liu, Zhuchen, et al. "Synthesis of three-dimensional graphene from petroleum asphalt by chemical vapor deposition." Materials Letters 122 (2014): 285-288.*
Zhang, Panpan, et al. "One-step synthesis of large-scale graphene film doped with gold nanoparticles at liquid-air interface for electrochemistry and Raman detection applications." Langmuir 30.29 (2014): 8980-8989.*
Ambrosi, Adriano, et al. "Metallic impurities in graphenes prepared from graphite can dramatically influence their properties." Angewandte Chemie International Edition 51.2 (2012): 500-503.*
Gan, Yanjie, Litao Sun, and Florian Banhart. "One-and Two-Dimensional Diffusion of Metal Atoms in Graphene." Small 4.5 (2008): 587-591.*

(Continued)

*Primary Examiner* — Richard M Rump
(74) *Attorney, Agent, or Firm* — Norton Rose Fulbright US LLP

(57) ABSTRACT

Compositions and methods directed to producing metal-doped graphene and the metal-doped graphene derivatives from pitch are disclosed.

5 Claims, 38 Drawing Sheets
(14 of 38 Drawing Sheet(s) Filed in Color)

(56) References Cited

OTHER PUBLICATIONS

Tripkovic, Vladimir, et al. "Electrochemical CO2 and CO reduction on metal-functionalized porphyrin-like graphene." The Journal of Physical Chemistry C 117.18 (2013): 9187-9195.*
Ali et al., "Nickel and Vanadyl Porphyrins in Saudi Arabian Crude Oils," Energy Fuels. 1993, vol. 7, No. 2, pp. 179-184.
Chouparova et al., "Characterization of petroleum deposits formed in a producing well by synchrotron radiation based microanalyses," Energy Fuels. 2004, vol. 18, No. 4, pp. 1199-1212.
Krasheninnikov et al., "Embedding Transition-Metal Atoms in Graphene: Structure, Bonding, and Magnetism," Phys. Rev. Lett 2009, vol. 102, 126807.
Krasheninnikov et al., "Attractive interaction between transition-metal atom impurities and vacancies in graphene: a first-principles study," Theoretical Chemistry Accounts, 2011, vol. 129, No. 3, pp. 625-630.
Pena et al., "Distribution of Vanadyl porphyrins in a Mexican offshore heavy crude oil," Fuel Processing Technology. 1996, vol. 46, No. 3, pp. 171-182.
Titov et al., "Catalytic Fe-xN Sites in Carbon Nanotubes," J. Phys. Chem. C. 2009, vol. 113, pp. 21629-21634.
Wei et al., "Synthesis of N-Doped Graphene by Chemical Vapor Deposition and Its Electrical Properties," Nano Lett. 2009, vol. 9, pp. 1752-1758.
Wu et al., "Light non-metallic atom (B, N, O and F)—doped graphene: a first-principles study," Nanotechnol 2010, vol. 21, 505202.

* cited by examiner

VANADYL (IV) Tetraphenylporphine
$C_{44}H_{28}N_4OV$

NICKEL Tetraphenylporphine
$C_{44}H_{28}N_4Ni$

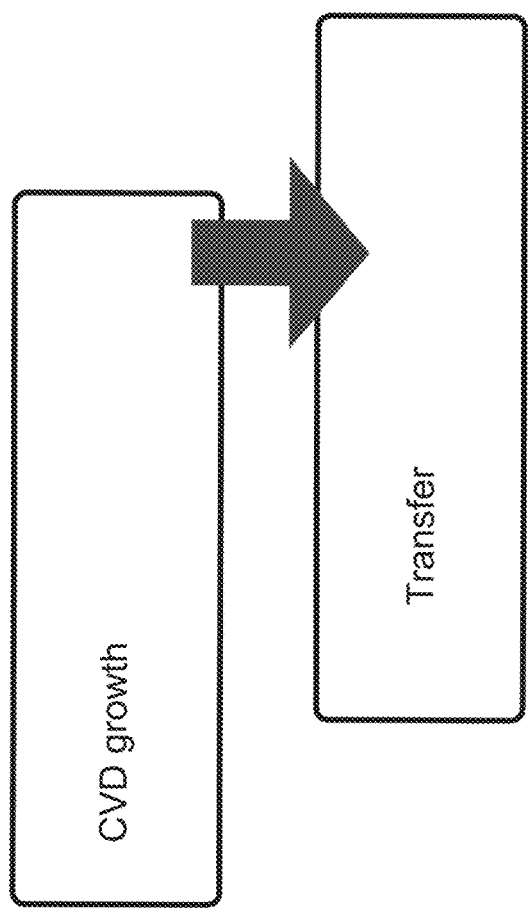

COMPOSITIONS AND METHODS RELATED TO DOPED GRAPHENE DERIVED FROM ASPHALTENES

CROSS-REFERENCE TO RELATED APPLICATIONS

This application claims the benefit of the filing date of U.S. Provisional Patent Application No. 62/087,695, filed on Dec. 4, 2014, by the inventors of this application, and incorporated herein by reference.

STATEMENT REGARDING FEDERALLY SPONSORED RESEARCH

Not applicable.

TECHNICAL FIELD OF THE INVENTION

The present disclosure relates generally to compositions and methods related to doped graphene derived from asphaltenes. More particularly, the disclosure relates to methods for making a metal-doped graphene from pitch. The resulting graphene and graphene derivatives compositions have a wide variety of uses.

BACKGROUND

Crude oil is a complex mixture of organic and inorganic species. Pitch is the residue that is left after refining crude oil under vacuum and high temperatures. It is generally considered waste and is the major component of road tar. Pitch contains thousands of aromatic hydrocarbons with 3 to 8 fused ring systems, which is also known as carbon mesophase. The carbonaceous pitches containing asphaltene are useful in the formation of a variety of carbon artifacts due to their high carbon-to-hydrogen ratio. There is a need for additional methods and resulting compositions that can use pitch to generate useful asphaltene and asphaltene derivatives.

SUMMARY

In view of the aforementioned problems and trends, general embodiments of the present disclosure provide compositions and methods for producing metal-doped graphene and the metal-doped graphene derivatives from pitch.

In one aspect of the disclosure, the method of making a metal-doped graphene includes the steps of p preparing an asphaltene thin film on a metal catalyst substrate; and heating the asphaltene thin film/catalyst at 400° C. or higher and at pressures of $1 \times 10^{-3}$ Torr or higher forming a metal-doped graphene.

In yet another aspect, these methods may lead to the production of a metal-doped graphene.

Other aspects of the embodiments described herein will become apparent from the following description and the accompanying drawings, illustrating the principles of the embodiments by way of example only.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 6A depicts the dopant materials present in the form of metalloporphyrins while FIG. 10 is a schematic of doped graphene produced using the methodology disclosed herein, FIG. 14A is a schematic of the atomic structure of porphyrin-like functionalized graphene while

NOTATION AND NOMENCLATURE

Figure 1:
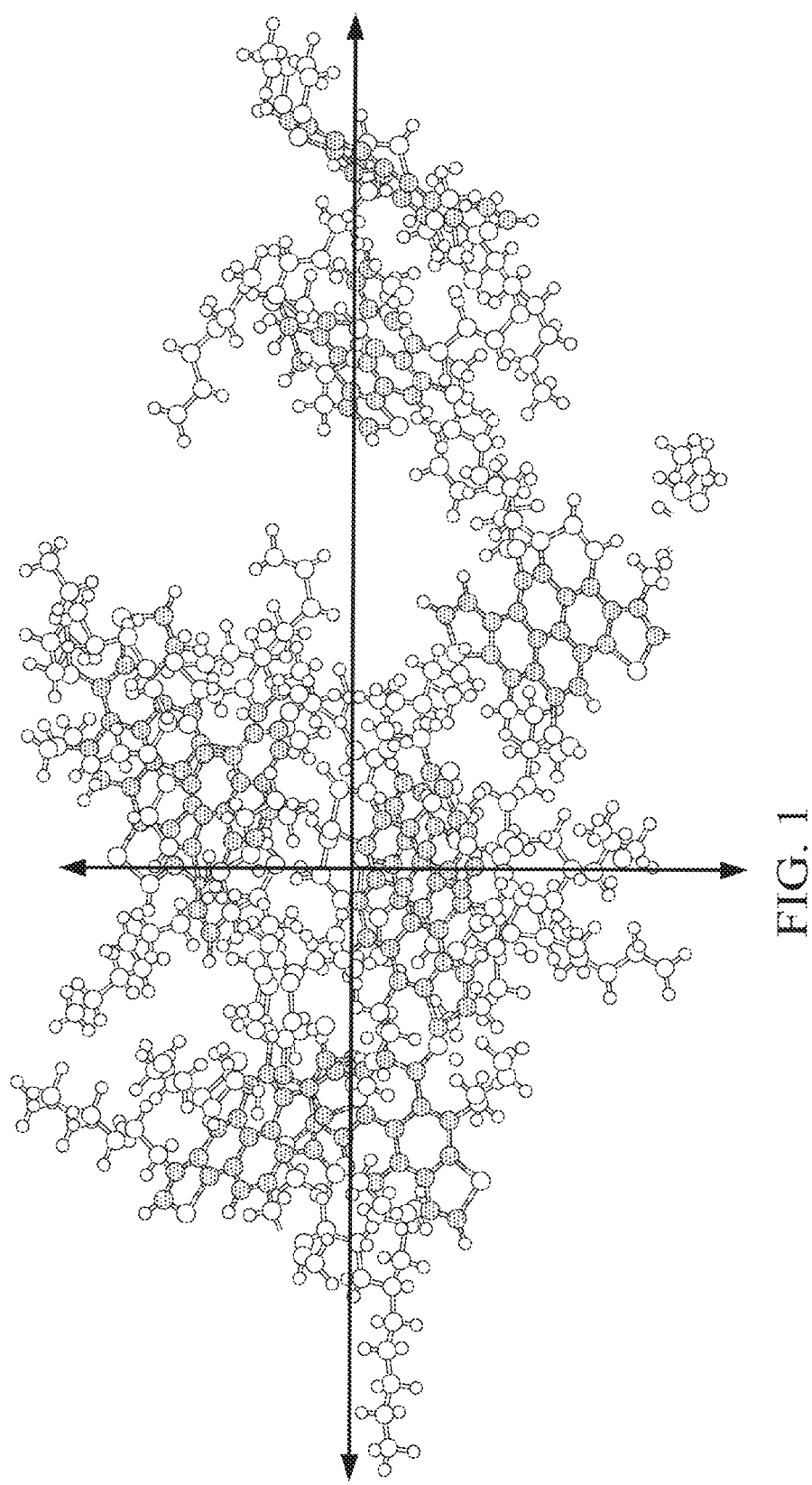
FIG. 1 is a schematic depicting a typical asphaltene structure.

Certain terms are used throughout the following description and claims to refer to particular system components and configurations. As one skilled in the art will appreciate, the same component may be referred to by different names. This document does not intend to distinguish between components that differ in name but not function.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. Thus, they should be interpreted to mean "including, but not limited to . . . ."

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Certain embodiments are directed to a method of fabricating and doping graphene from asphaltenes. Crude oil is a complex mixture of organic and inorganic species. Pitch is the residue that is left after refining crude oil under vacuum and high temperatures. It is generally considered waste and is the major component of road tar. The methods described herein can be used to form graphenes and graphene derivative from an inexpensive source that is generally considered waste, e.g., pitch.

Pitch contains thousands of aromatic hydrocarbons with 3 to 8 fused ring systems, which is also known as carbon mesophase. The carbonaceous pitches containing asphaltene are useful in the formation of a variety of carbon artifacts due to their high carbon-to-hydrogen ratio. A typical asphaltene structure is shown in FIG. 1.

Asphaltene is a part of crude oils that contain a large number of structures, in specific high molecular weight bonded aromatic hydrocarbons components with heteroatoms. Asphaltene appears brown or black in color, and the melting point differs with oil geographical sources. The definition today is similar; it is insoluble in n-alkanes, such as n-pentane or n-heptane, and soluble in toluene. Asphaltene extracted using n-pentane known as C5-Asphaltene and with n-heptane known as C7-Asphaltenes. The amount, chemical composition, and molar mass distribution of the Asphaltene "solubility class" vary significantly with the source of the crude oil and with the method of precipitation.

Several metals (e.g., Ni, V, Fe, Al, Na, Ca, and Mg) shown to accumulate in the asphaltenes fraction of crude oil, typically in concentrations less than 1% w/w. Vanadium and nickel, the most abundant of the trace metals, present mainly as chelated porphyrin compounds, and they linked to catalyst poisoning during upgrading of heavy oils. The concentrations of other trace metals not bound in porphyrin structures (e.g., Fe, Al, Na, Ca, and Mg) indicated to change in deposits as a function of well depth, and amongst sub fractions of asphaltene.

Others in the art have developed new materials spun out of boron, nitrogen, carbon, and oxygen that shows evidence of sought-after thermal properties as well as magnetic, optical, and electrical properties. Its potential applications range from 20-megapixel arrays for cellphone cameras, photo detectors or atomically thin transistors that when multiplied by the billions could fuel computers.

Herein, the present disclosure teaches novel methods to dope graphene with TMs as an alternative to exfoliated, chemical derived and high energy e-beam based methods by using n-alkane extracted asphaltenes.

Graphene is defined by IUPAC as "a single carbon layer of the graphite structure [ . . . ] its nature by analogy compared to a polyaromatic hydrocarbon (PAHs) of quasi infinite size." While it has been demonstrated that graphene can be fabricated from various raw materials including PAHs, research and industry has not produce a graphene material with in-plane metal dopants. The methods and materials described herein can be used to produce materials consisting of a metal atom coordinated in a porphyrin ring or a free base porphyrin embedded in a graphene structure. Porphyrins are a group of heterocyclic macrocycle organic compounds, composed of four modified pyrrole subunits interconnected at their a carbon atoms via methine bridges (=CH—) (see FIG. 6A for an example). The parent porphyrin is porphine, and substituted porphines are called porphyrins. The porphyrin macrocycle is aromatic, possessing $4n+2\pi$ electrons (n=4, for the shortest cyclic path).

Graphene-type molecules, typically large polycyclic aromatic hydrocarbons (PAHs), have gained enormous interest because of their unique self-organization behavior and promising electronic properties for applications in organic electronics.

There are many different forms of carbon "graphene" but inconsistency and confusion in nomenclature still exist as illustrated in Table 1 below. Furthermore, the lack of standards makes it difficult for buyers to have assurances regarding the performance and quality that would be required for using such materials commercially. Thus, producers now primarily sell such materials for research and development purposes.

TABLE 1

Product nomenclature for graphene

| Number of sheets | Product description |
|---|---|
| 1 | Graphene (monolayer) (SLG) |
| 1-3 | Very few layer graphene (vFLG) |
| 2-5 | Few layer graphene (FLG) |
| 2-10 | Multilayer graphene (MLG) |
| >10 | Exfoliated graphite or "Graphene nanoplatelets" (GNP) |

There are few companies that sell a graphene product that have an application to the end user/consumer.

TABLE 2

For monolayer films or suspended single layer sheets of graphene, these materials can be subdivided by planar size

| Lateral dimensions | Product description |
|---|---|
| <100 nm | Graphene nanosheets |
| 100 nm to 100 um | Graphene microsheets |
| >100 um | Graphene sheets |
| >10 mm | Graphene film or wafer |

As exemplified by Tables 1 and 2 above, it is easy to see that many graphene based products overlap in definition; for example, FLG and MLG. While the present examples relate to SLG/monolayer and MLG, it should be understood that the scope of the disclosure is not limited to SLG and MLG but encompasses all graphene based products of any planar size, regardless of nomenclature.

Methods and compositions produced by these methods have many applications, including but not limited to: (a) conductive, transparent film used in applications such as transparent electrodes for touch screens or solar cells; (b) surface area component of an electrode for applications such as fuel cells, super-capacitors and lithium ion batteries; (c) additive for mechanical, electrical, thermal, barrier and fire resistant properties of a polymer; (d) band gap engineering components electronic applications related to semiconducting; and (e) catalytic materials.

Figure 2:
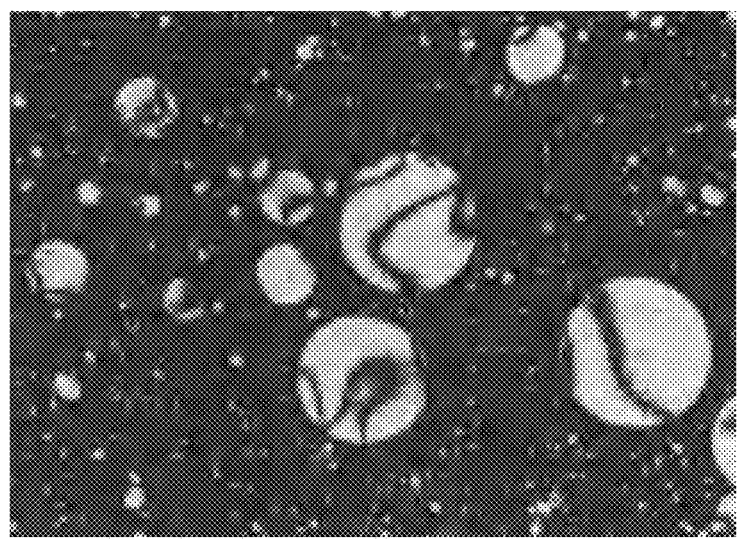
FIG. 2 depicts an optically anisotropic mesophase.

These pitches, which contain asphaltene, are generally extracted and fractionated using methods that exploit solubility in toluene and insolubility in heptane. When heat is applied to these pitches, they polymerize and become optically anisotropic. This is the mesophase described above. The optical anisotropy is due to the lining up of asphaltene layers perpendicular to the optic axis. FIG. 2 depicts an optically anisotropic mesophase viewed with a polarizing microscope.

A graphene material can be constructed from the asphaltene mesophase, which assembles in sp2-hybridized structures comprising carbon-carbon bonds. In other embodiments, these structures may also comprise of graphene materials with heteroatoms such as oxygen, nitrogen, hydrogen, sulfur or other molecular architectures such as metalloporphyrins with Mo, Zn, Cd, Ti, Ni, V, Fe, Mn, Cr and Co.

Certain aspects of the present disclosure are directed to methods of making a metal-doped graphene comprising: preparing an asphaltene thin film on a metal catalyst substrate; and heating the asphaltene thin film/catalyst at 400° C. or more using pressures of $1 \times 10^{-3}$ Torr or higher forming a metal-doped graphene. The method can further comprise removing metal catalyst from the metal-doped graphene by etching (e.g., ammonium persulfate) or lifting (e.g., transfer tape). In a further aspect the catalyst comprises one or more metal selected from Mo, Zn, Cd, Ti, Ni, V, Fe, Mn, Cr and Co. The asphaltene thin film can be heated under a non-oxygen inert gas flow, such as He, Ar, $N_2$ in conjunction with a reducing gas such as $H_2$. In certain aspects the asphaltene thin film is heated in a tube furnace.

TABLE 3

Elemental analysis of extracted doped material.

| Element | Wt % | Atomic Wt | Stochiometry |
|---|---|---|---|
| C | 80.88 | 12 | 6.74 |
| H | 8.26 | 1 | 8.26 |
| N | 1.07 | 14 | 0.115 |

TABLE 3-continued

Elemental analysis of extracted doped material.

| Element | Wt % | Atomic Wt | Stochiometry |
|---|---|---|---|
| O | 1.61 | 16 | 0.101 |
| S | 8.73 | 32 | 0.273 |
| Ni | 0.185 | 28 | 0.0067 |
| V | 0.0866 | 23 | 0.0038 |

Graphene can be prepared by isolating asphaltene from source material such as Crude oil. Asphaltene can be extracted using n-alkane. The extracted asphaltene can be dissolved in toluene and separated from other components that are insoluble in toluene. The asphaltene solution can be used to prepare an asphaltene thin film, e.g., by using spin coating. A metal catalyst can be used as a substrate for spin coating.

The growth of graphene can be done by annealing a clean metal catalyst under $H_2/Ar$ (<3 Torr at <500° C.). The metal catalyst can comprise one or more metals selected from Al, Au, Co, Cr, Cu, Fe, Ge, Mg, Mn, Mo, Ni, Rh, Si, Ta, Ti, W and Zn. An asphaltene thin film can be prepared by spin coating, spray coating, sputtering, or physical vapor deposition of asphaltene onto the metal catalyst. The catalyst/thin film is heated in a tube furnace under pressures ranging between $1 \times 10^{-3}$ Torr and 1500 Torr. The thin film is heated under $H_2/Ar$ gas flow at temperatures between 400° C. and 1000° C. The graphene is allowed to grow for 15-180 minutes. After growth the metal catalyst with graphene is removed from the furnace. The graphene is removed from the metal substrate (e.g., using transfer tape/PMMA). The catalyst is removed using acid etching (e.g., ammonium persulfate), heat release transfer tape, lift off methods utilizing protective polymer coatings to preserve the graphene layer. The graphene produced is then transferred to a substrate for use or further processing.

Figure 3B:
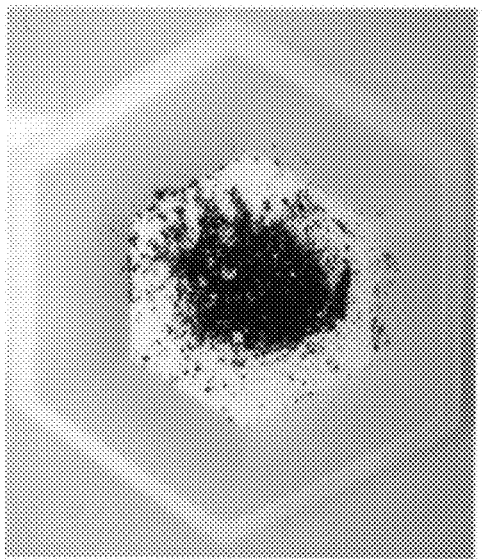
FIG. 3A illustrates the methodology for preparation of graphene growth using the doped materials noted in FIG. 3B.
Figure 3A:
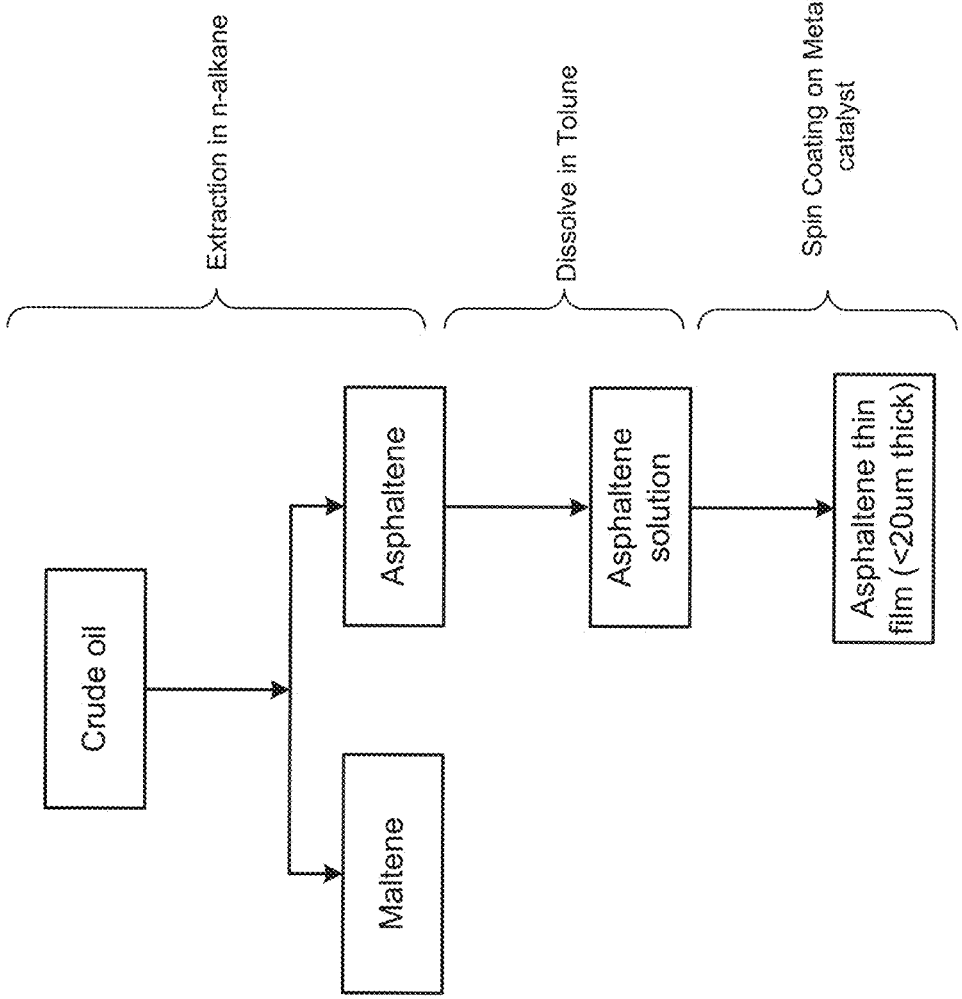
Figure 4:
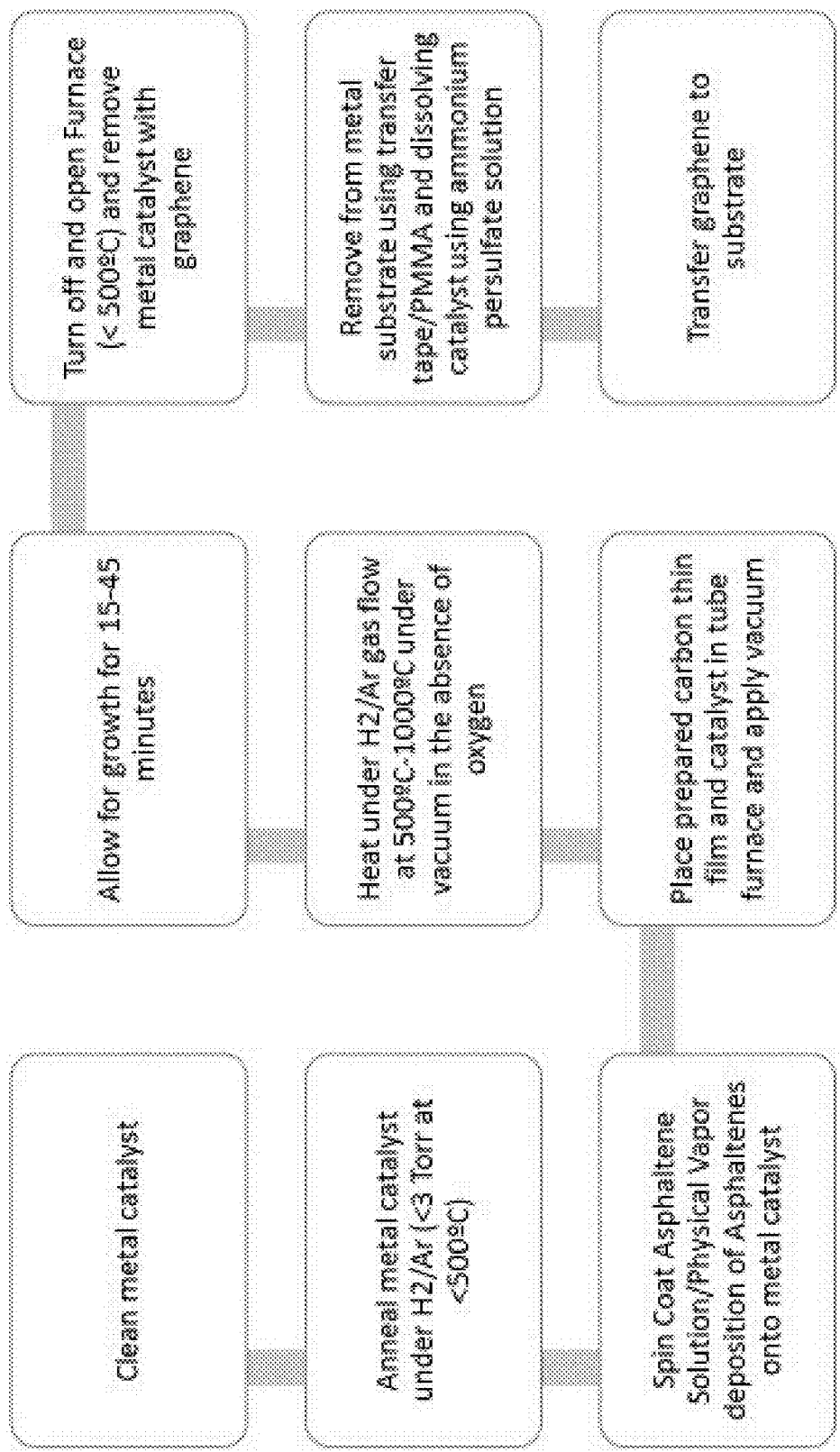
FIG. 4 illustrates the methodology for growth of graphene.
Figure 5B:
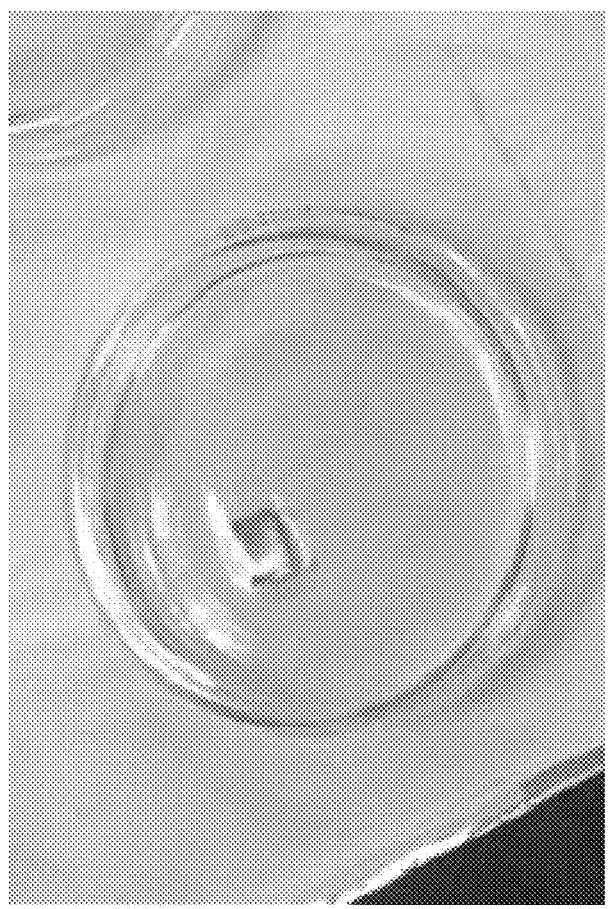
FIG. 5A depicts the metal substrate with graphene and FIG. 5B depicts removal of substrate from the graphene.
Figure 5A:
Figure 6B:
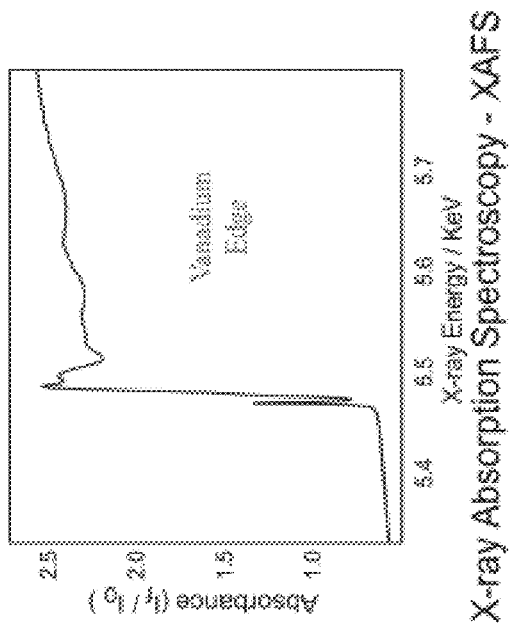
FIG. 6B is an X-ray Absorption Fine Structure (XAFS) analysis from synchrotron, FIG. 7 a schematic illustrating a current commercial method for producing chemically derived graphenes.
Figure 6A:
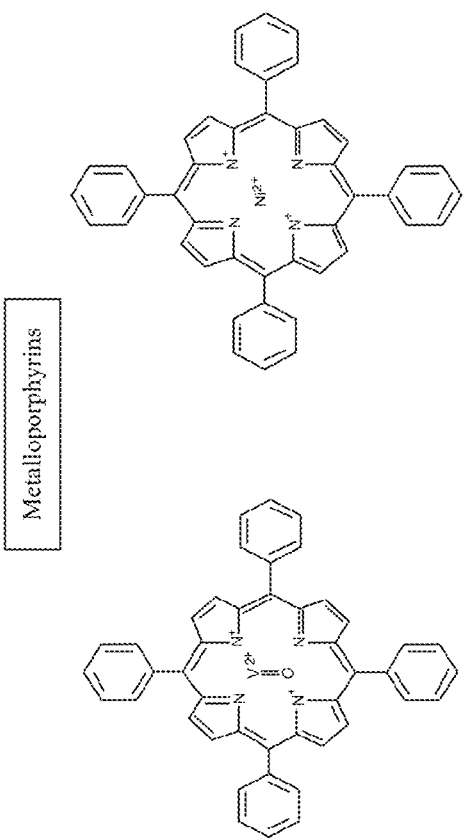

FIG. 3A illustrates the methodology for preparation of graphene growth using the doped materials noted in FIG. 3B, as taught in the present disclosure. FIG. 4 illustrates the methodology for growth of graphene. FIG. 5A depicts the metal substrate with graphene and FIG. 5B depicts removal of substrate from the graphene. FIG. 6A depicts the dopant materials present in the form of metalloporphyrins while FIG. 6B is an X-ray Absorption Fine Structure (XAFS) analysis from synchrotron.

Other embodiments of the invention are directed to the metal-doped graphene produced by the method described above as well as other devices comprising such metal-doped graphene materials.

Example I

SLG was produced using carbon solids instead of a hydrocarbon gas. A Chemical Vapor Deposition (CVD) was utilized for this process with the intent of doping the graphene with transition metals (TM) in an easy and inexpensive fashion. As disclosed herein, TMs can greatly enhance graphene devices with new magnetic and electronic properties. While the data is not shown, MLG was also produced using the methods disclosed herein. Thus, the methods disclosed herein provides a fast and inexpensive means for producing a broad variety of graphenes doped with TM.

Figure 7:
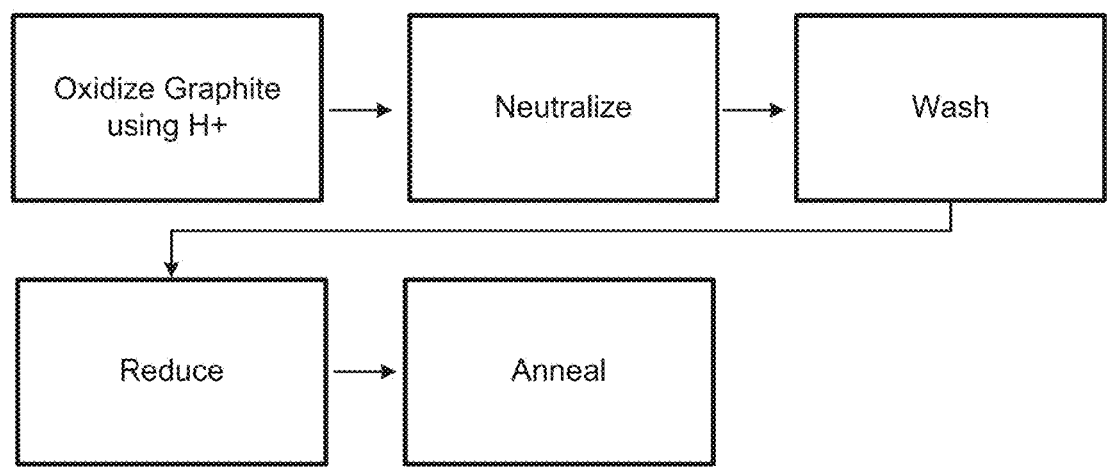

In another aspect of the invention, a method disclosed herein as depicted in FIG. 7 was compare to graphene doped products produced by chemical derived graphene (CDG) methods. Specifically, materials relating to 1) graphite oxide, 2) graphene oxide, and 3) graphene were characterized and for further application. CDGs are commercially significant because of their uses in technologies such as energy storage materials, solution process able solar cells, printable sensors, or quantum dots.

Testing of the products resulting from the methods disclosed herein are structurally comparable to chemical derived graphenes (CDGs) and may hold significant advantages when considering the ease of preparation. These materials are primarily sold as Graphene Nano Platelets (GNPs) in the form of graphite oxide. From there, the user would disperse in a liquid, apply and reduce the materials. Not only does the material produced by the methods disclosed herein, disperse in solution, it is not oxidized and so it does not need reduction. The fact that it is not oxidized eliminates producing materials using very strong acids and therefore also eliminates neutralizing and washing steps.

FIG. 7 illustrates the methodology for producing MLG as disclosed herein.

Figure 8:
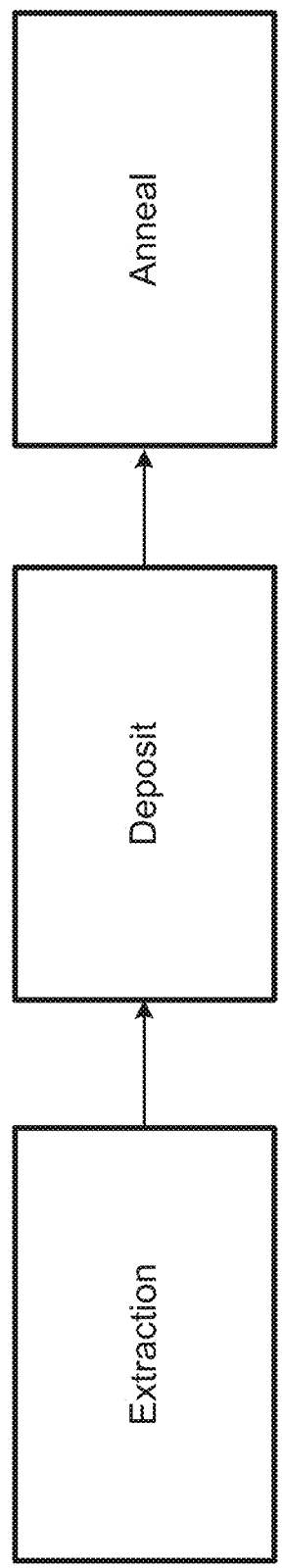
FIG. 8 is a schematic illustrating the methodology for producing MLG and FLG using the disclosed methodology.

FIG. 8 is a schematic illustrating the methodology for producing MLG and FLG using the disclosed methodology.

Graphene produced from Chemical Vapor Deposition is viable for use in technologies such as touch screens, sensors, transistors, novel optical/electronic/photonic devices such as IR cameras, radiation shielding and camera lenses. Transition metal (TM) atoms and graphene have recently been a topic of great interest. They are expected to induce novel magnetic and superconducting behavior. Because of this interest, there have been extensive theoretical studies but the experimental exploration of TM/graphene systems is very limited.

Figure 9:
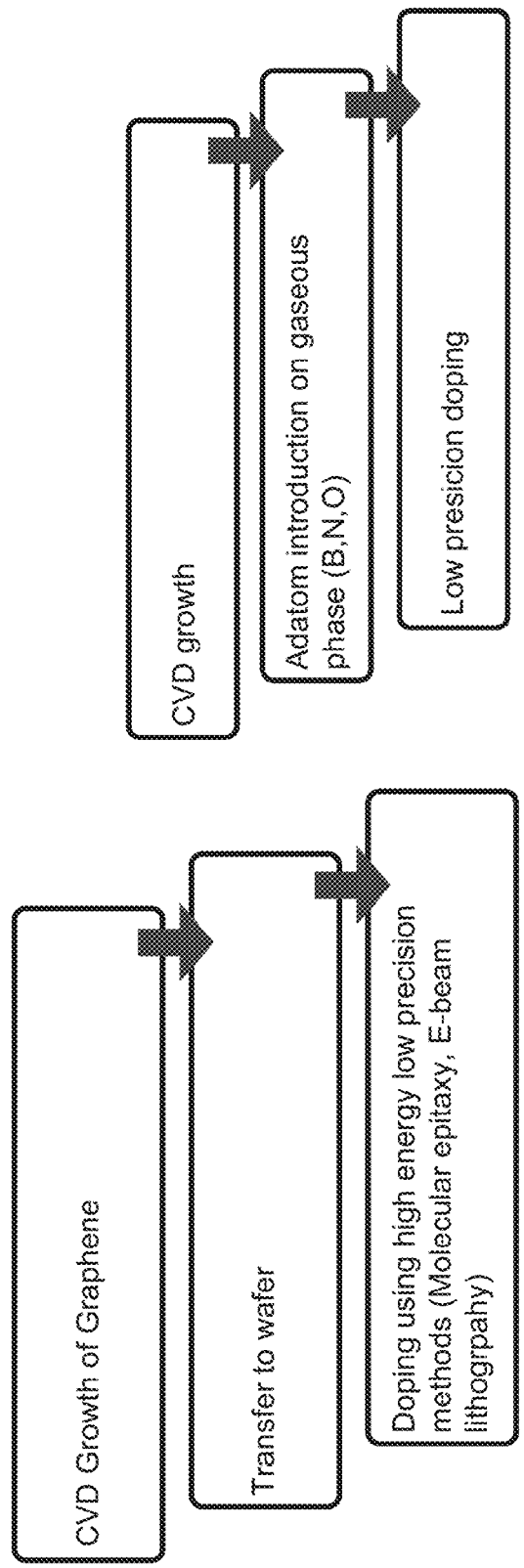
FIG. 9 is a schematic of two commercial methodologies used to make doped graphene.

FIG. 9 is a schematic of two commercial methodologies used to make doped graphene while FIG. 10 is a schematic of doped graphene produced using the methodology disclosed herein.

Graphene with Boron and Nitrogen (BCN) is a sought after material due to the fact that graphene has no band gap. Graphene in its single crystal form is a conductor, not a semi-conductor, so while it has properties desirable in the research context, it has yet to make a significant impact on the commercial electronic industries for this reason.

BCN is currently being studied because it can be introduced by vapor. In contrast, TMs cannot be introduced by vapor. Even if they could be introduced at high temperatures, it has been determined that they would not be stable in an in-plan configuration due to the high differences in energy between TMs and carbon. Boron and Nitrogen both neighbor carbon on the periodic table and do not have a large difference in electron structure.

The carbon source generated from waste crude oils is unsuitable for hydrocracking because of the presence of TMs. The current disclosure enables the user to utilize such waste as a valuable source of metalloporphyrins for placing TMs doping graphene materials.

Figure 11A:
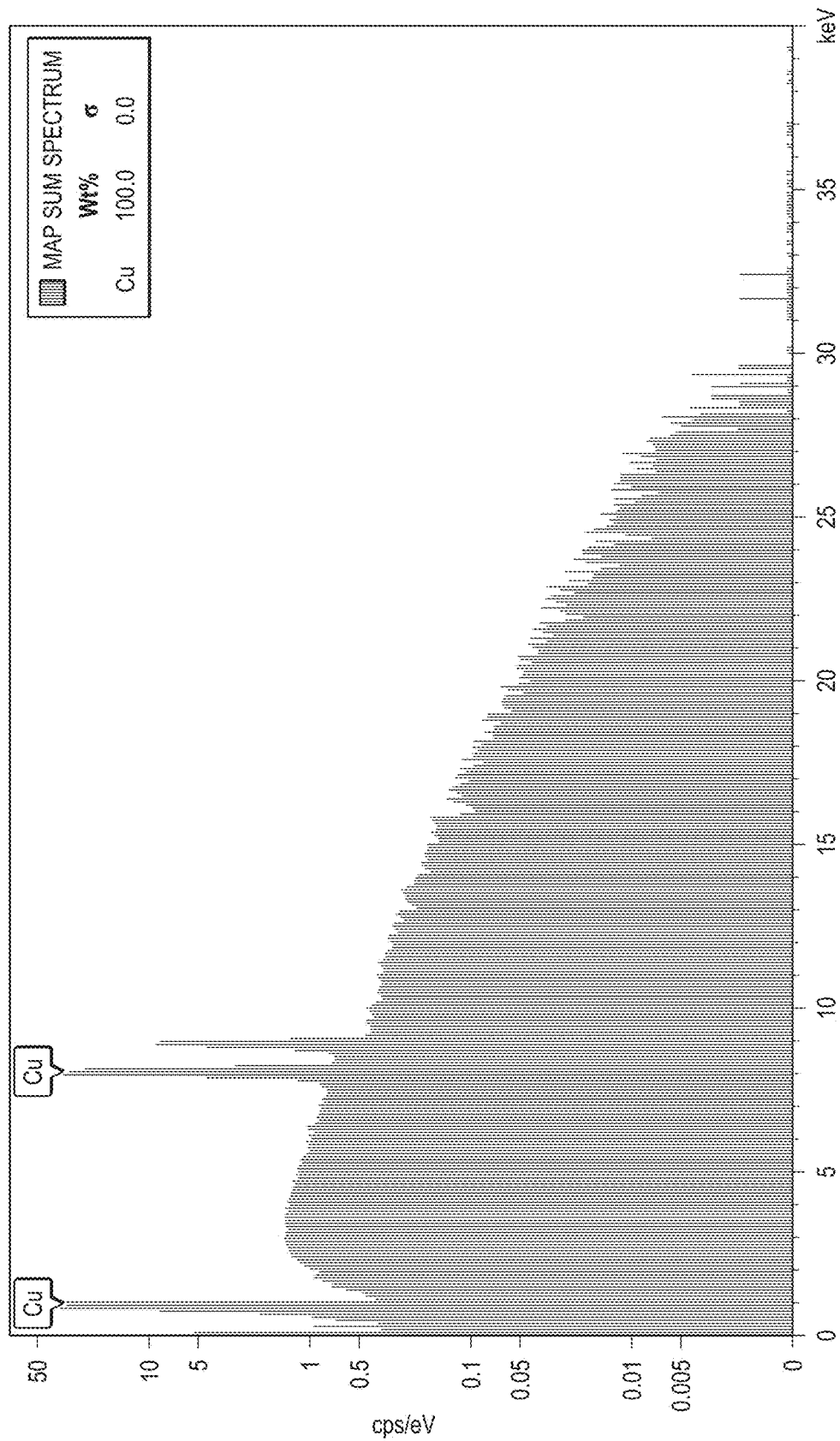
FIG. 11A is an EDX analysis of copper foil sonicated in acetone before application of solid carbon source with the corresponding SEM image in FIG. 11B
Figure 11B:
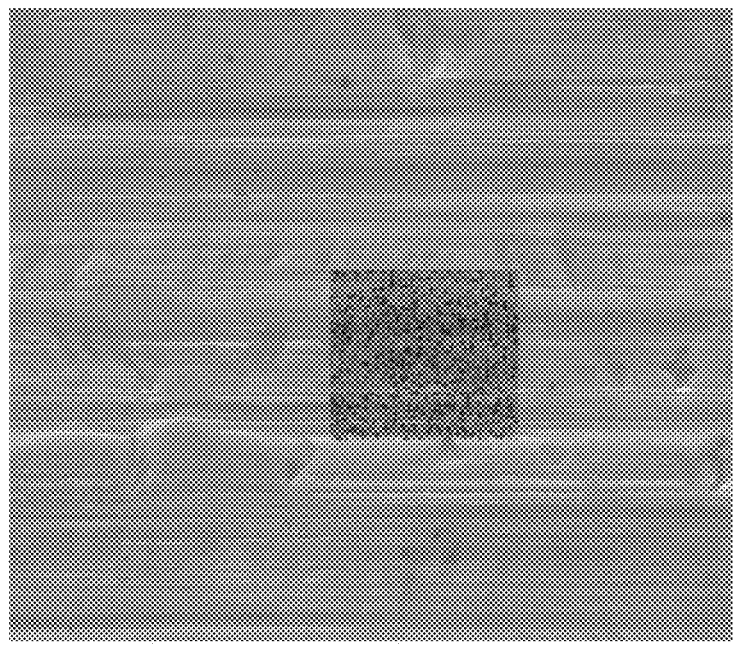
FIG. 11C is an EDX elemental analysis respectively from the SEM section, depicted in FIG. 11D, after growth.
Figure 11D:
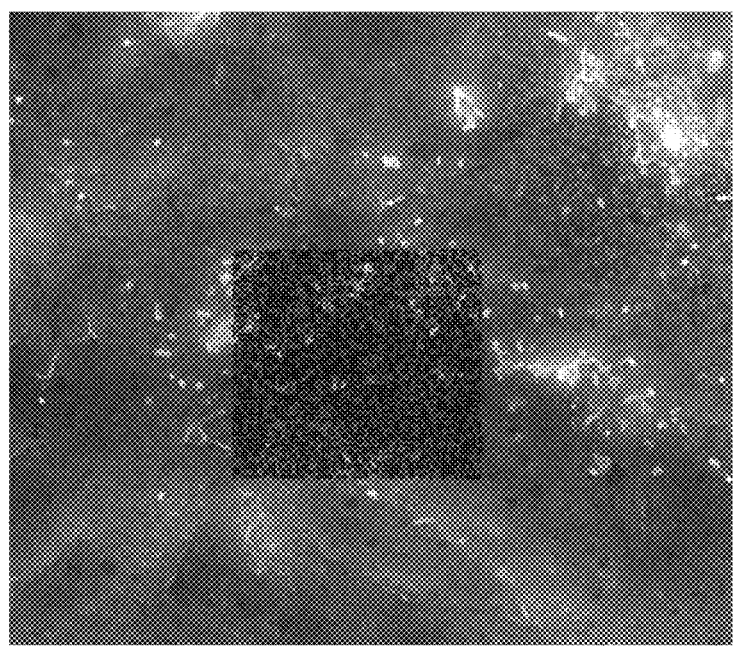
Figure 11C:
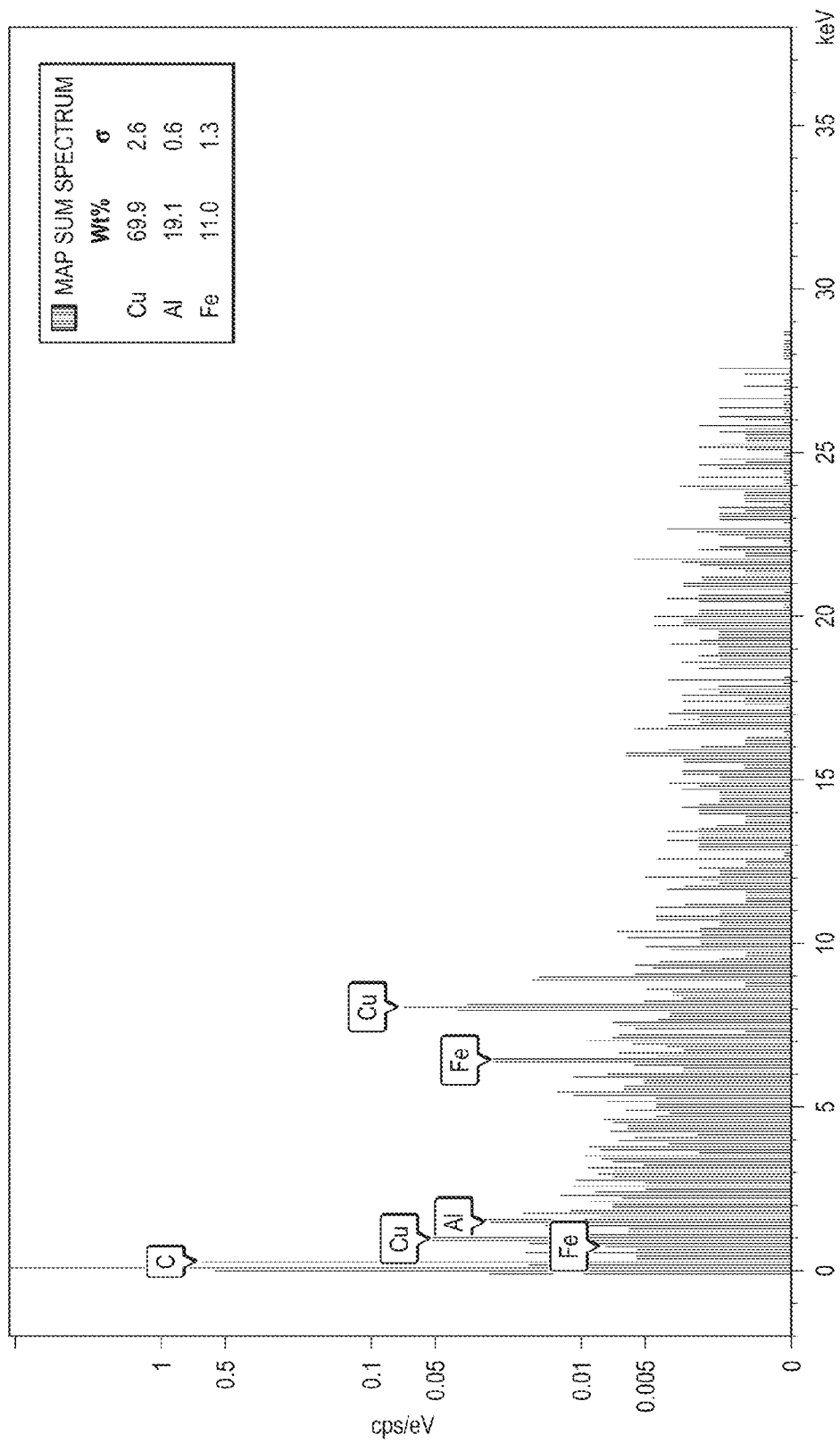
Figure 12:
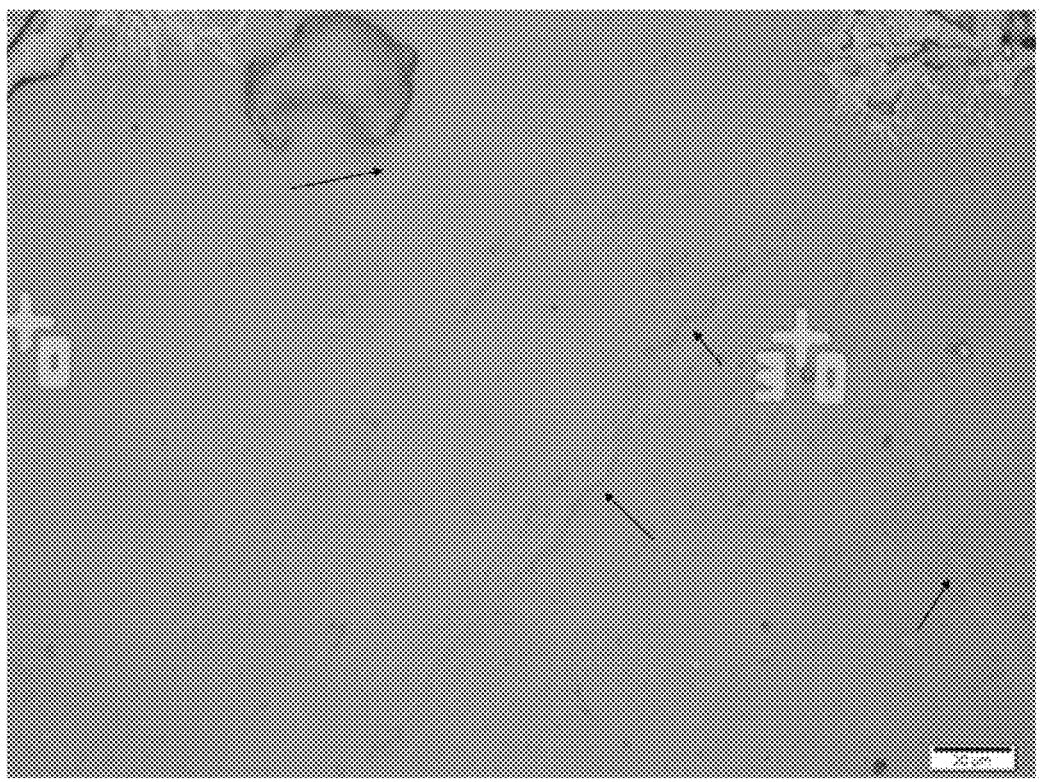
FIG. 12 illustrates that the transferred graphene from carbon solids on SiO2/Si wafer has rips and wrinkles in the material as shown by arrows.

FIG. 11A is an EDX analysis of copper foil sonicated in acetone before application of solid carbon source with the corresponding SEM image in FIG. 11B. FIG. 11C is an EDX elemental analysis respectively from the SEM section, depicted in FIG. 11D, after growth. FIG. 12 illustrates that the transferred graphene from carbon solids on SiO2/Si wafer has rips and wrinkles in the material as shown by arrows.

Figure 13A:
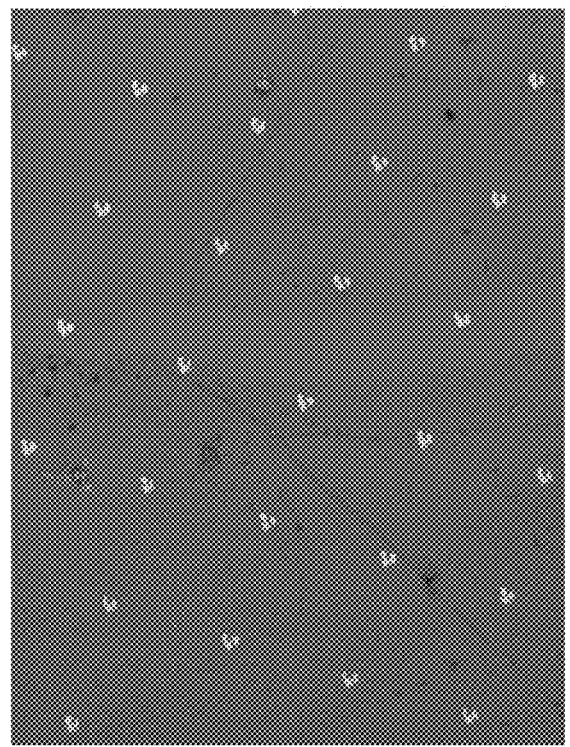
FIGS. 13A-B are optical microscope images of a graphene sheet (purple) on an SiO2/Si wafer (pink) with wrinkles and tears in the material.
Figure 13B:
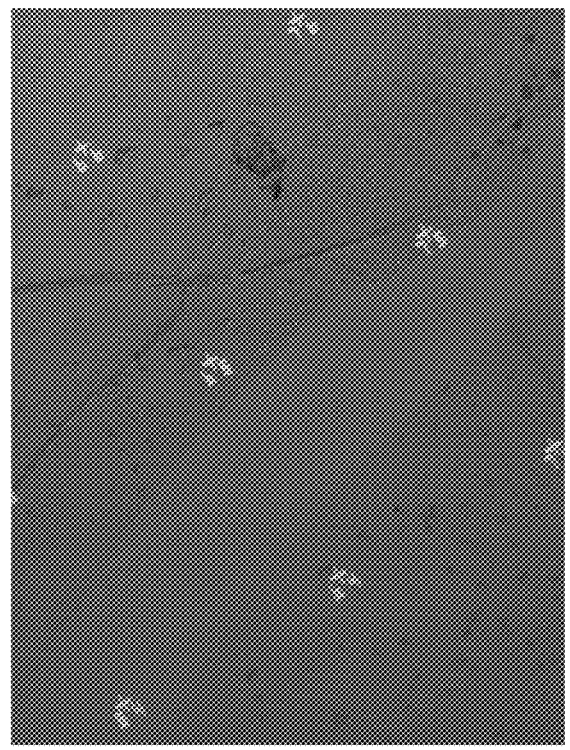

FIGS. 13A and 13B are optical microscope images of a graphene sheet (purple) on a SiO2/Si wafer (pink) with wrinkles and tears in the material. Specifically, the example images in FIGS. 13A and 13B shows graphene grown from a commercial method using CH4 (methane gas). It is transparent in nature and may be used to compare the qualities of the graphene grown using the method disclosed herein (starting from solids) in FIG. 12, FIG. 24 and FIG. 26.

Example II

Further embodiments of the present disclosure were expanded upon based on current developments in the field. As already noted herein, the electronic and magnetic properties of graphene can be modified through combined transition-metal (TM) and nitrogen decoration of vacancies. Additional modes of functionalization that are currently being explored for a wide range of applications include applications in nanoelectronics, spintronics, and electrocatalysts.

Figure 14A:
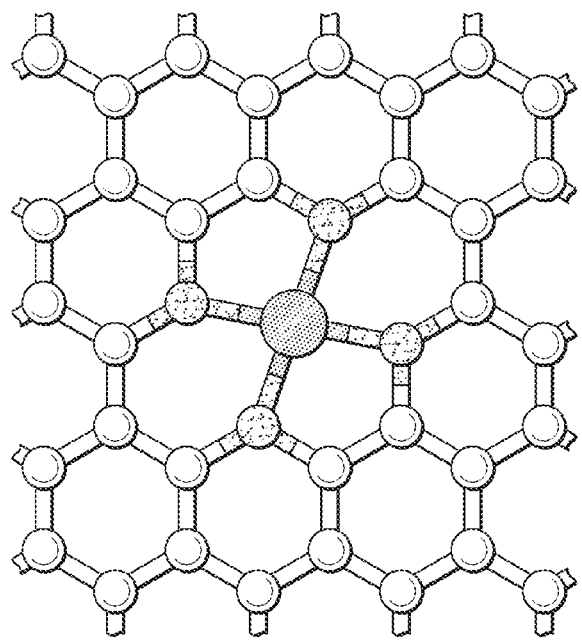
Figure 14B:
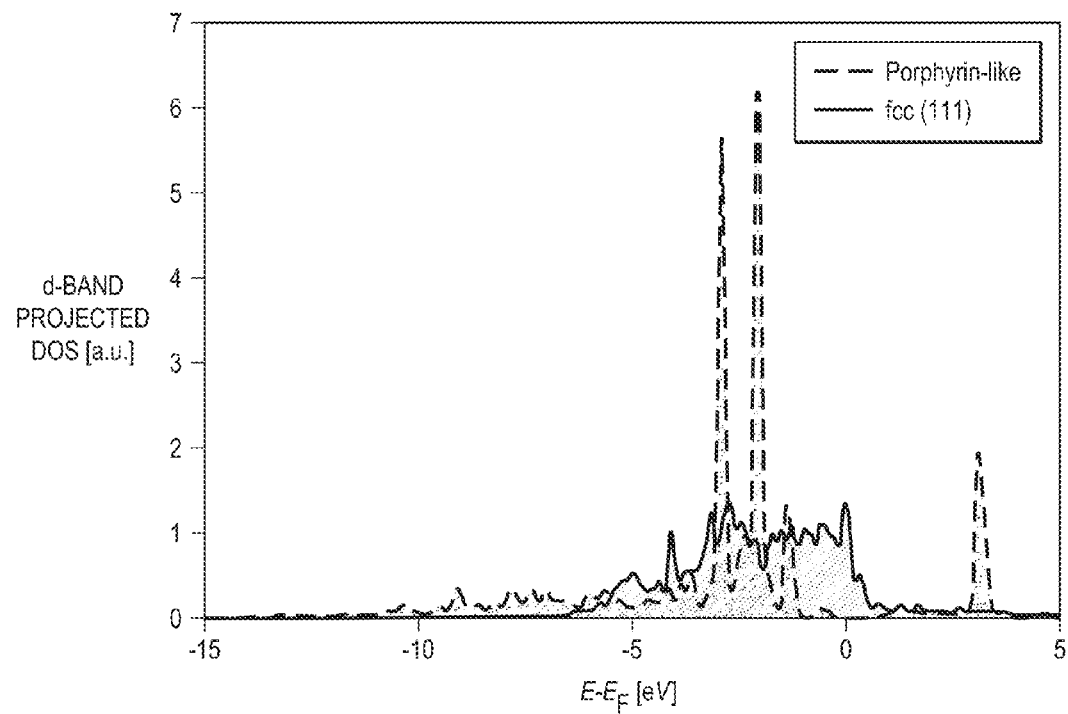
FIG. 14B illustrates a comparison of density of states projected onto the d orbitals of the Fe atom located at the center of the porphyrin ring and the Fe surface atom in Fe (111) surface.

FIG. 14A is a schematic of the atomic structure of porphyrin-like functionalized graphene. The central metal atom is coordinated to four nitrogen atoms, forming the porphyrin ring that is embedded in a graphene matrix. FIG. 14B illustrates a comparison of density of states projected onto the d orbitals of the Fe atom located at the center of the porphyrin ring and the Fe surface atom in Fe (111) surface.

Additional modifications are based on the prior art that TMs bind to graphene strongly in a four nitrogen configuration. The stability in the presence of the defects associated with TMs can be attributed to the reduced electrostatic repulsion between nitrogen lone-pair electrons due to the hybridization between N and TM.

Figure 15A:
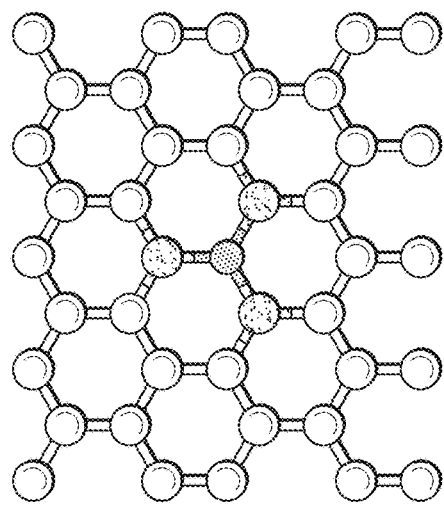
FIG. 15A illustrates TM-adsorbed N-doped graphene.
Figure 15B:
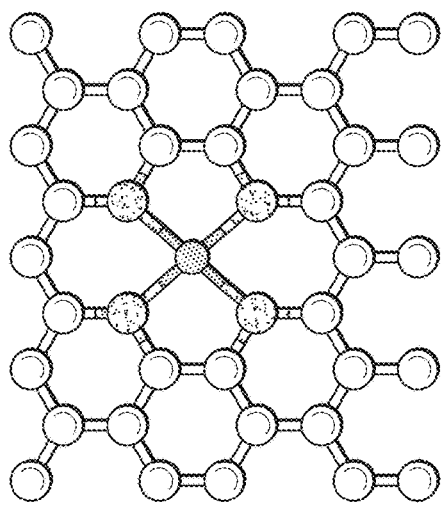
FIG. 15B illustrates a TM-N3 defect.
Figure 15C:
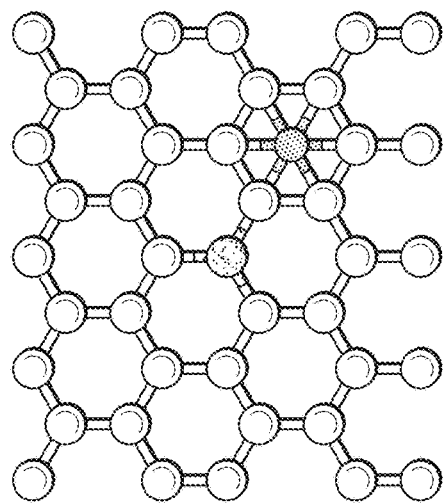
FIG. 15C illustrates aTM-N2 defect.
Figure 15D:
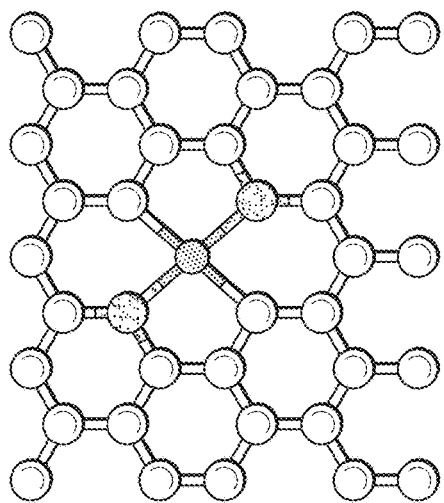
FIG. 15D illustrates TM-N4 defect configurations wherein white represents carbon; lightly speckled represents nitrogen; and densely speckled represents cobalt or iron, FIGS. 16A and B are photographs of asphaltene extracted by n-pentane (FIG. 16A) and n-heptane (FIG. 16B)

FIG. 15A illustrates TM-adsorbed N-doped graphene, FIG. 15B illustrates a TM-N3 defect, FIG. 15C illustrates a TM-N2 defect, and FIG. 15D illustrates TM-4 defect configurations wherein white represents carbon; lightly speckled represents nitrogen; and densely speckled represents cobalt or iron.

As known in the art, results from Density Functional Theory (DTF) studies have predicted these types of structures to be particularly promising candidates for graphene-based ferromagnets, which could find applications in nanoelectronics and nanomagnetism.

Figure 16B:
Figure 16A:
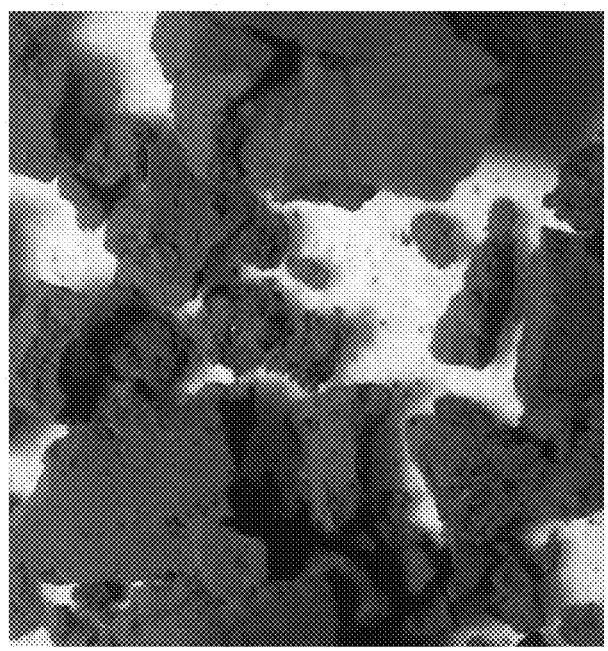

FIGS. 16A and B are photographs of asphaltene extracted by n-pentane (FIG. 16A) and n-heptane (FIG. 16B).

Large Scale Methods

Asphaltene Extraction:

Asphaltene materials were extracted from crude using different n-alkanes and dissolved in toluene for deposition. Asphaltene/toluene (1 mg/ml) solutions were then deposited using drop coating and later spin coating (500 rpm and 1000 rpm for 60 sec) onto previously prepared copper foil.

Annealing: A 4" tube furnace was used to anneal the material under a reducing environment (H2). The system was equipped with a turbo pump with a direct line-of-sight to the sample substrate allowing base pressures below 10-8 Torr. To reach high vacuum, not only is a turbo pump used and all the flanges on the high vacuum side of the system are conflat flanges; capable of achieving ultra-high vacuum (UHV). Reaching lower background pressures allows the removal of undesired residual gasses like water and oxygen from the system before growth which can etch graphene at high temperature. The turbo pump also allows the system to reach pressures low enough (below 10-5 Torr) to use a residual gas analyzer (RGA).

Figure 17:
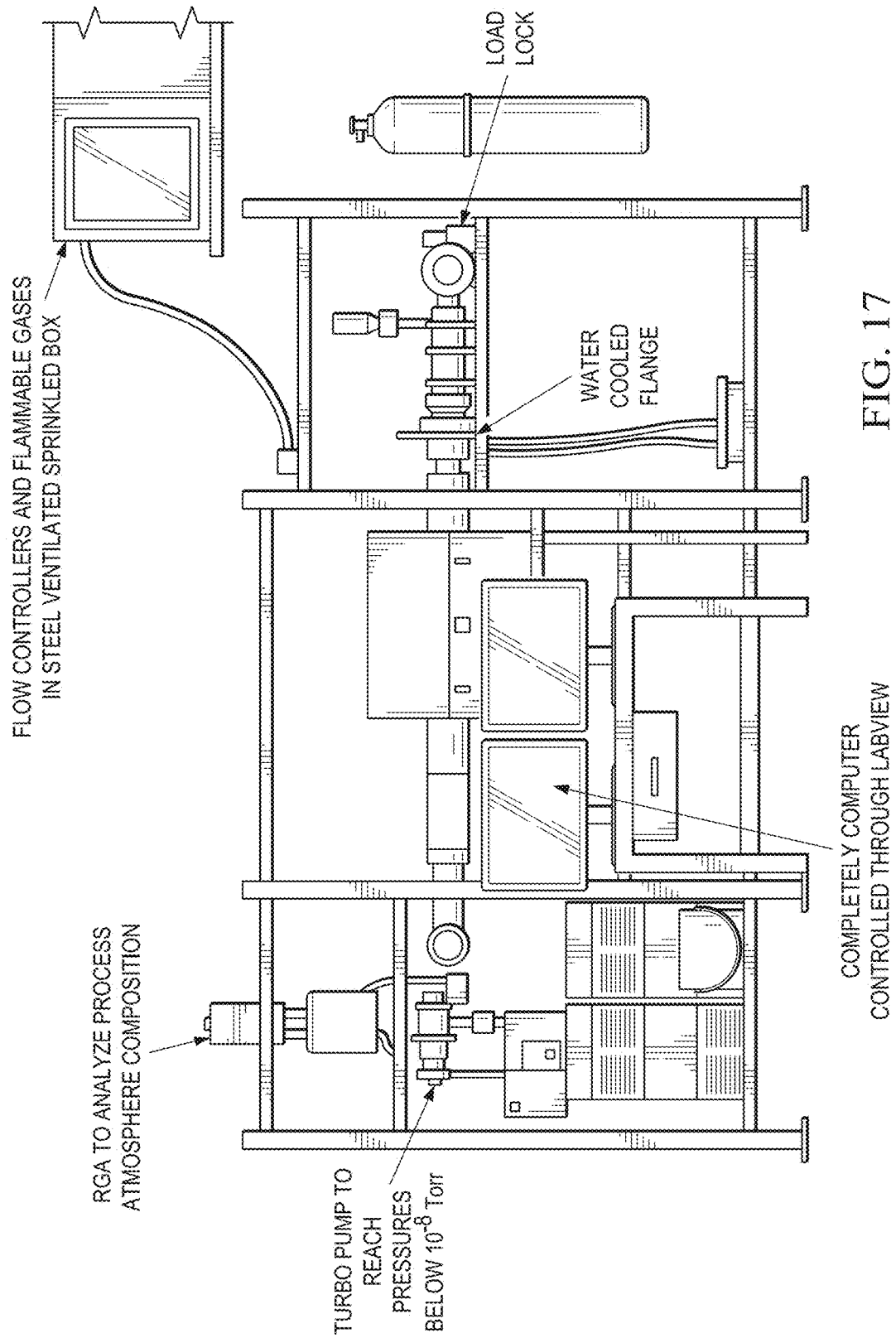
FIG. 17 depicts the furnace apparatus used to develop some to the teaching of the present disclosure.

In a typical growth, the sample was loaded into the furnace and allowed to pump down using the turbo pump for two hours prior to heating and gas flow. FIG. 17 depicts the furnace apparatus used to develop some of the teaching of the present disclosure.

TABLE 4

Experimental conditions and parameters used in experiment

| Experiment | Temperature [° C.] | Time [min] | Material | Deposition SC—Spin coated DC—Drop coated | Gas |
|---|---|---|---|---|---|
| A | 1050 | 5 | Synthetic, C7, C9 | SC | *H (10 ccm) |
| B | 1050 | 5 | C7 | DC | H (10 ccm) |
| C | 1050 | 5 | Synthetic | DC | H (10 ccm) |

*heated to 900 C. for 30 min in air and then ramped to 1050 C. under 10 ccm H

Characterization of the resulting doped products was then undertaken.

Raman:

Raman was taken using Witec Alpha 300 micro-Raman confocal microscope after graphene had been transferred to SiO2/Si wafers.

SEM:

Images were take using a FEI Quanta 650 SEM equipped with Bruker EDX system for chemical analysis.

Optical Microscope:

Asphaltenes were imaged on copper foils before and after growth. Transfers were performed by spin coating polymer, dissolving copper foil and transferring graphene to SiO2/Si wafers. Zeiss Axiovert 100A Light Microscope was used to take images of asphaltenes before and after growth.

Results

Raman:

Conditions for graphene growth were applied for all experiments except for experiment A when hydrogen was shut off for a period of 30 minutes while temperatures ramped to 1050 C. During that time the samples were being annealed in air. The resulting averaged Raman from all experiments show heavy carbonization and some graphitization of the solid carbon source.

Figure 18A:
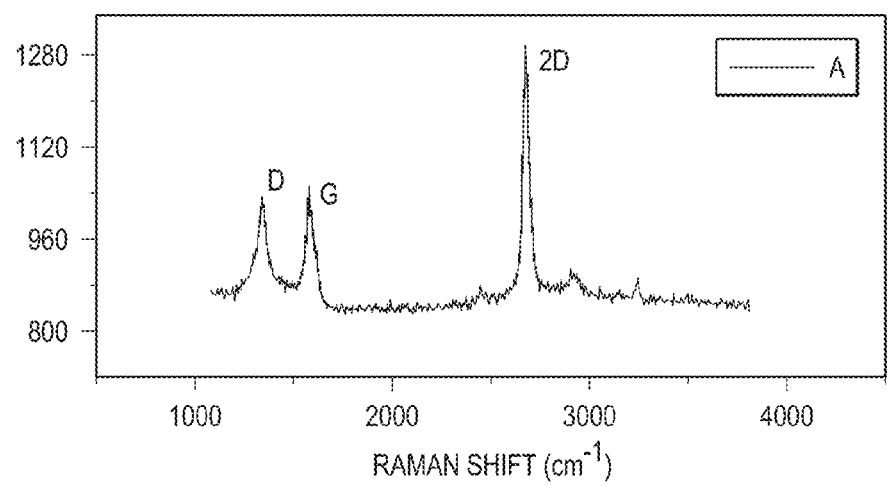
FIGS. 18A-18C illustrate Raman Shift data from experiments A to C disclosed herein, taken using Raman confocal microscope after graphene had been transferred to SiO2/Si wafers showing multilayer graphene (FIG. 18B-18C) and single layer graphene (FIG. 18A)
Figure 18B:
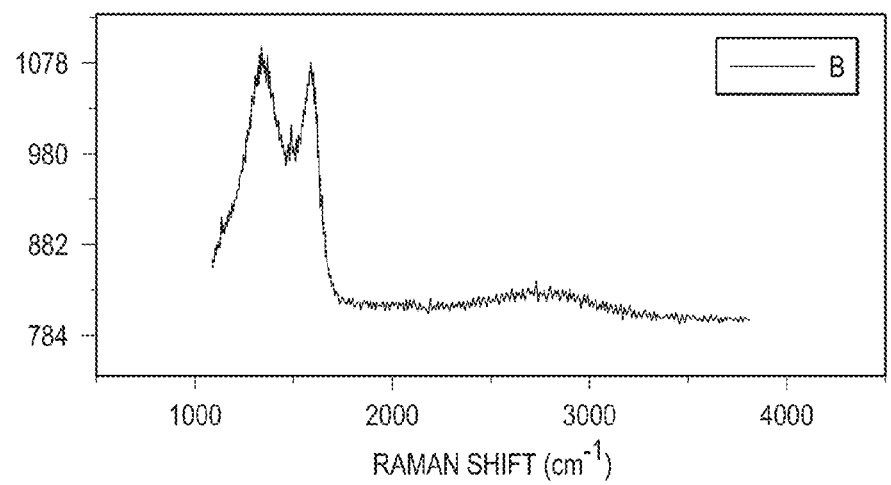
Figure 18C:
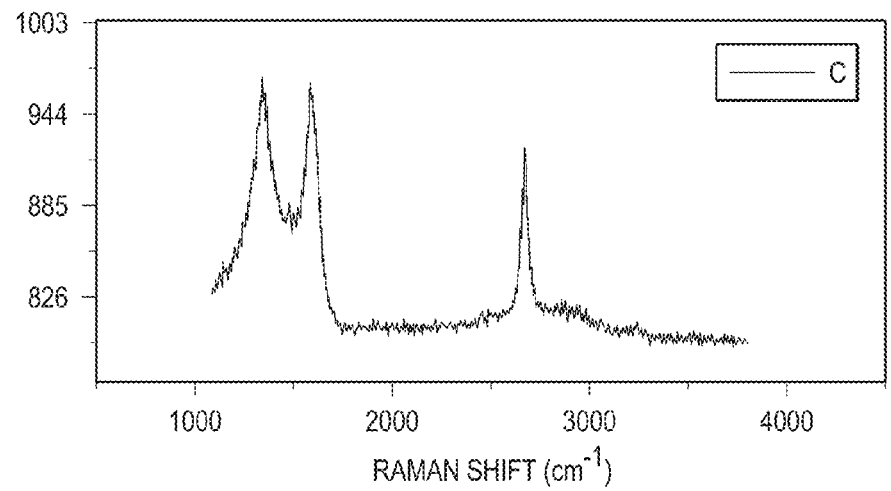
Figure 19A:
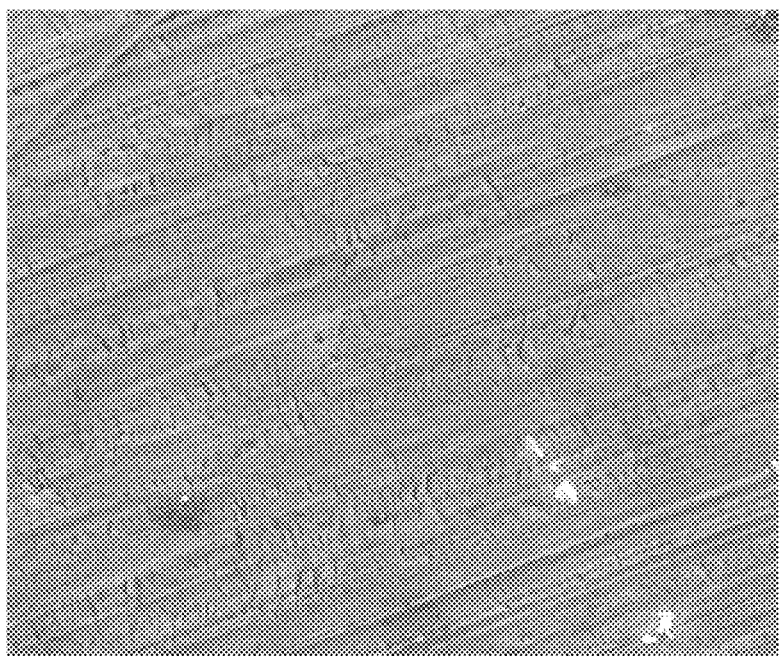
FIGS. 19A-19D are the SEM images of C7 asphaltene on copper foil before (FIG. 19A-19B) and after (FIG. 19C-19D) growth in Experiment A.
Figure 19B:
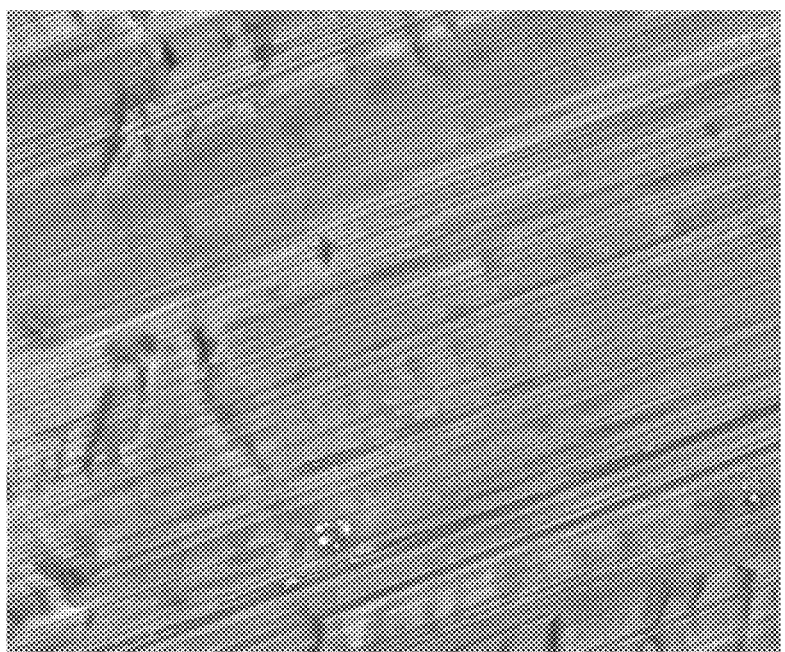
Figure 19C:
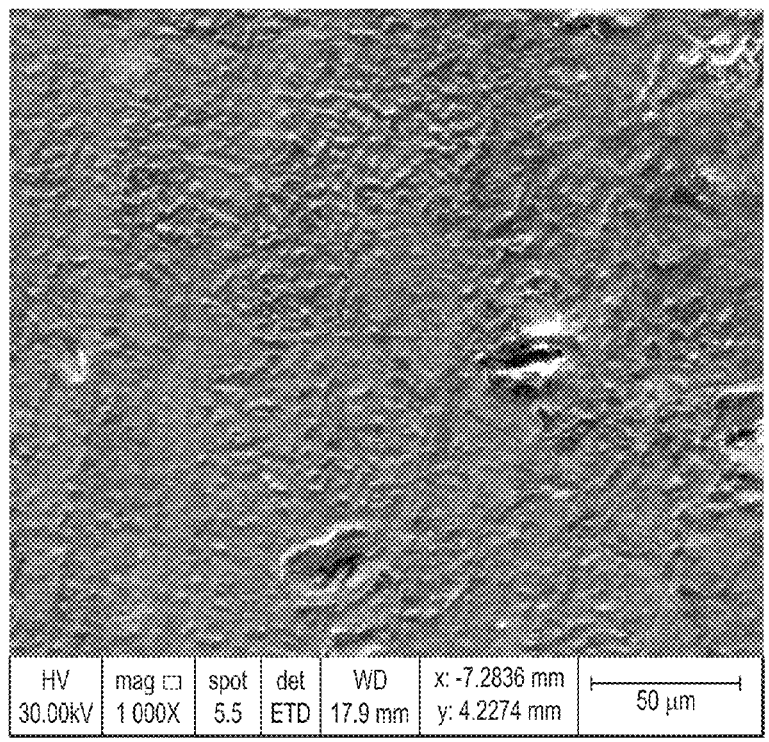
Figure 19D:
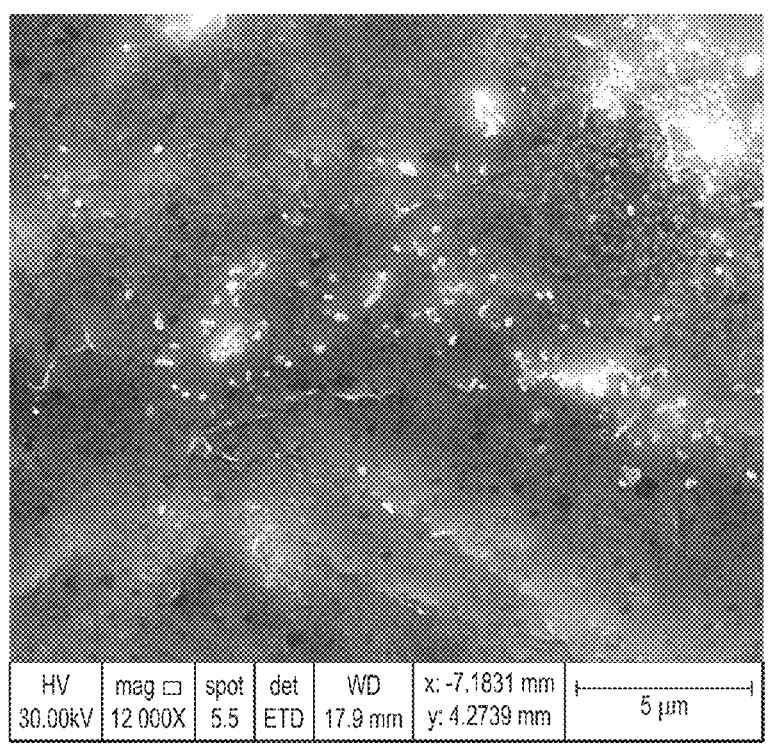

Results were able to find metals in more than one sample of the post growth C7 asphaltene but when hydrogen was used for the entire annealing and growth process, it was found that metals disappeared and that the Raman from FIGS. 18A-18C indicates mostly carbon with some graphitization.

Only experiment A exhibited the ratio of 2D to G and D peaks that would indicate the presence of quality graphene rather than $sp^2$ hybridized carbon.

Even so, this holds promise for doping graphene since areas analyzed are in the micron scale. Using STM, it is possible to analyze at the nanometer and angstrom scale. An area 20 atoms in size is suitable for single atom devices.

SEM/EDX:

Metals identified in post growth samples from experiment A and B included Al, Fe, Zr and adatoms included sulfur.

EDX analysis was taken of the copper foil before any etching in FIGS. 11A-11D. Foil which had been sonicated in acetone before applying asphaltenes shows no metals or adatoms present before growth indicating that metals and adatoms indeed came from asphaltene samples. After growth, Experiment A EDX shows the presence of Aluminum and Iron.

FIGS. 19A-19D are the SEM images of C7 asphaltene on copper foil before (FIG. 19A-19B) and after (FIG. 19C-19D) growth in Experiment A.

Experiment B indicated the presence of TMs Iron and Zirconium before growth but Iron disappears after growth conditions. This can most likely be explained by the partial pressure of CO/CO2 and the partial pressure of O2. The significance of the oxygen partial pressure is due to the fact that if it is higher than the equilibrium value, the metal will be oxidized, and if it is lower than the equilibrium value then the oxide will be reduced. Further analysis needs to be done with residual gas analysis data.

Figure 20A:
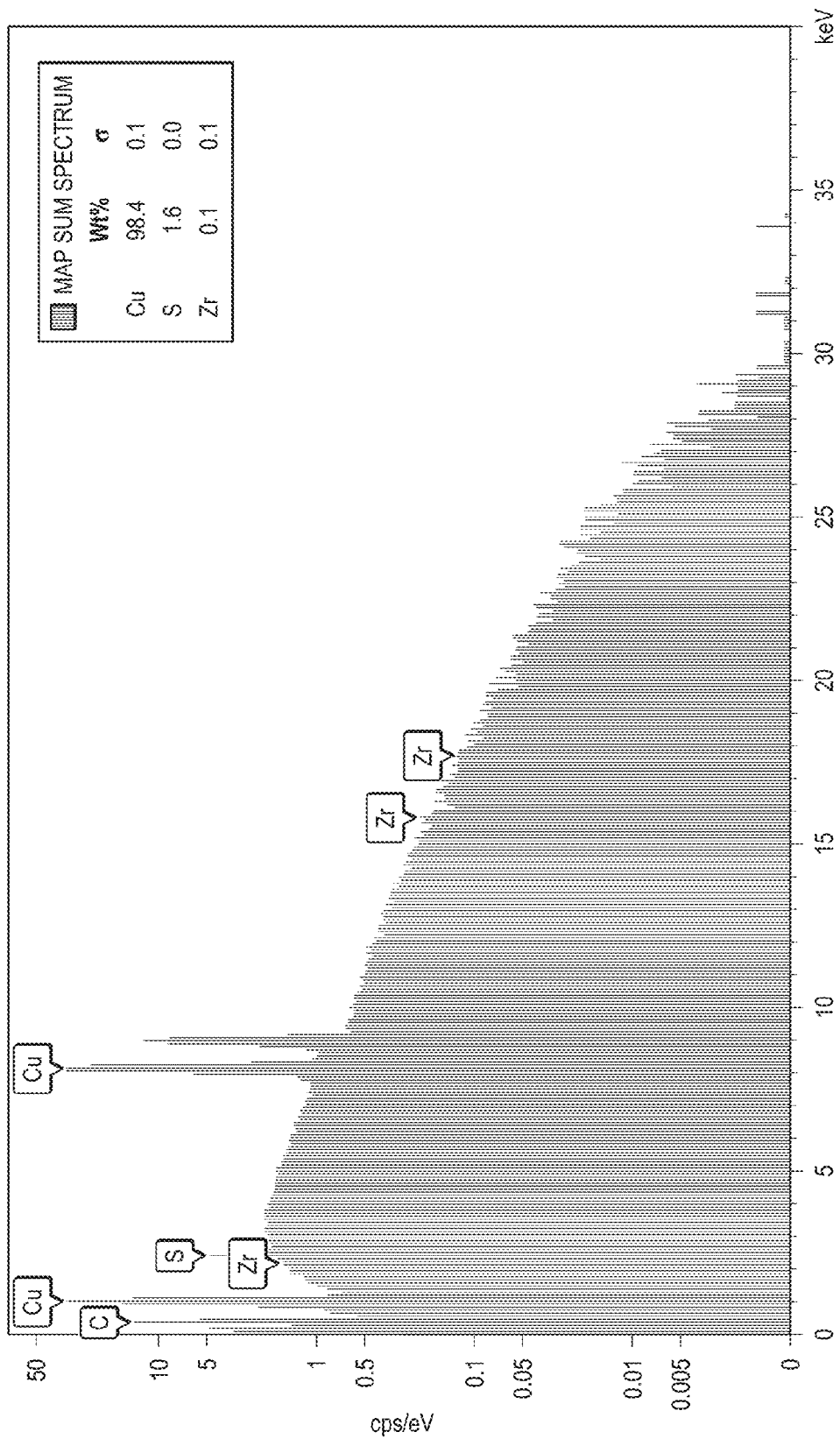
FIGS. 20A-20D illustrates the Energy Dispersive X-rays Spectroscopy (EDX) (FIG. 20A and FIG. 20C) and Scanning Electron Microscopy (SEM) photographs (FIG. 20B and FIG. 20D) from Experiment B after drop coating (FIG. 20A and FIG. 20B) and after growth (FIG. 20C and FIG. 20D)
Figure 20B:
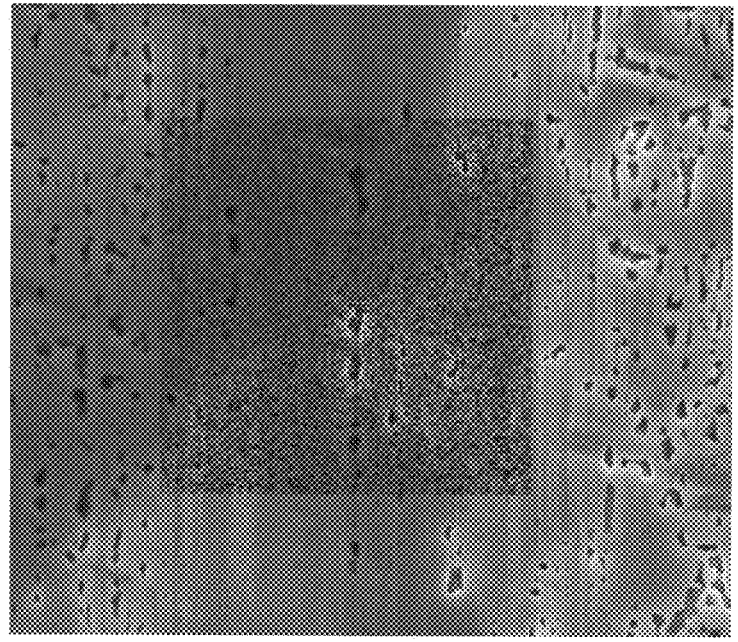
Figure 20D:
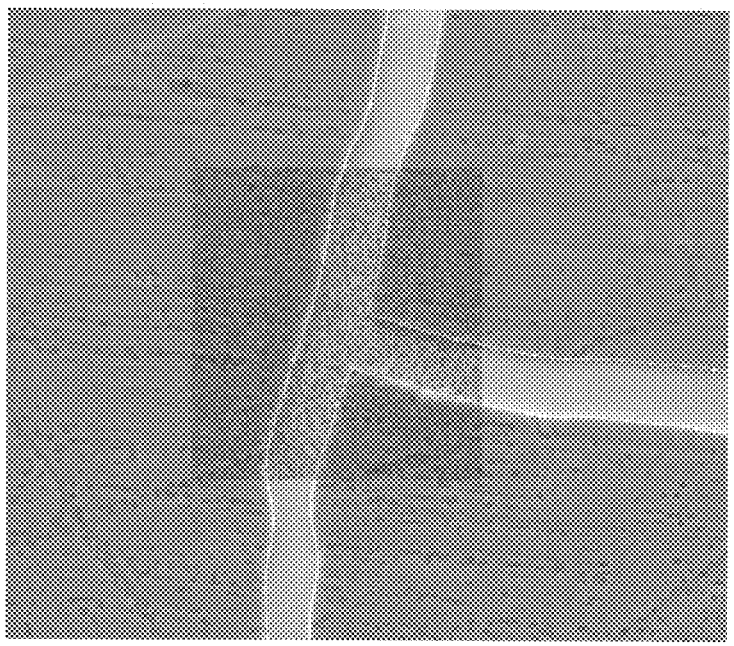
Figure 20C:
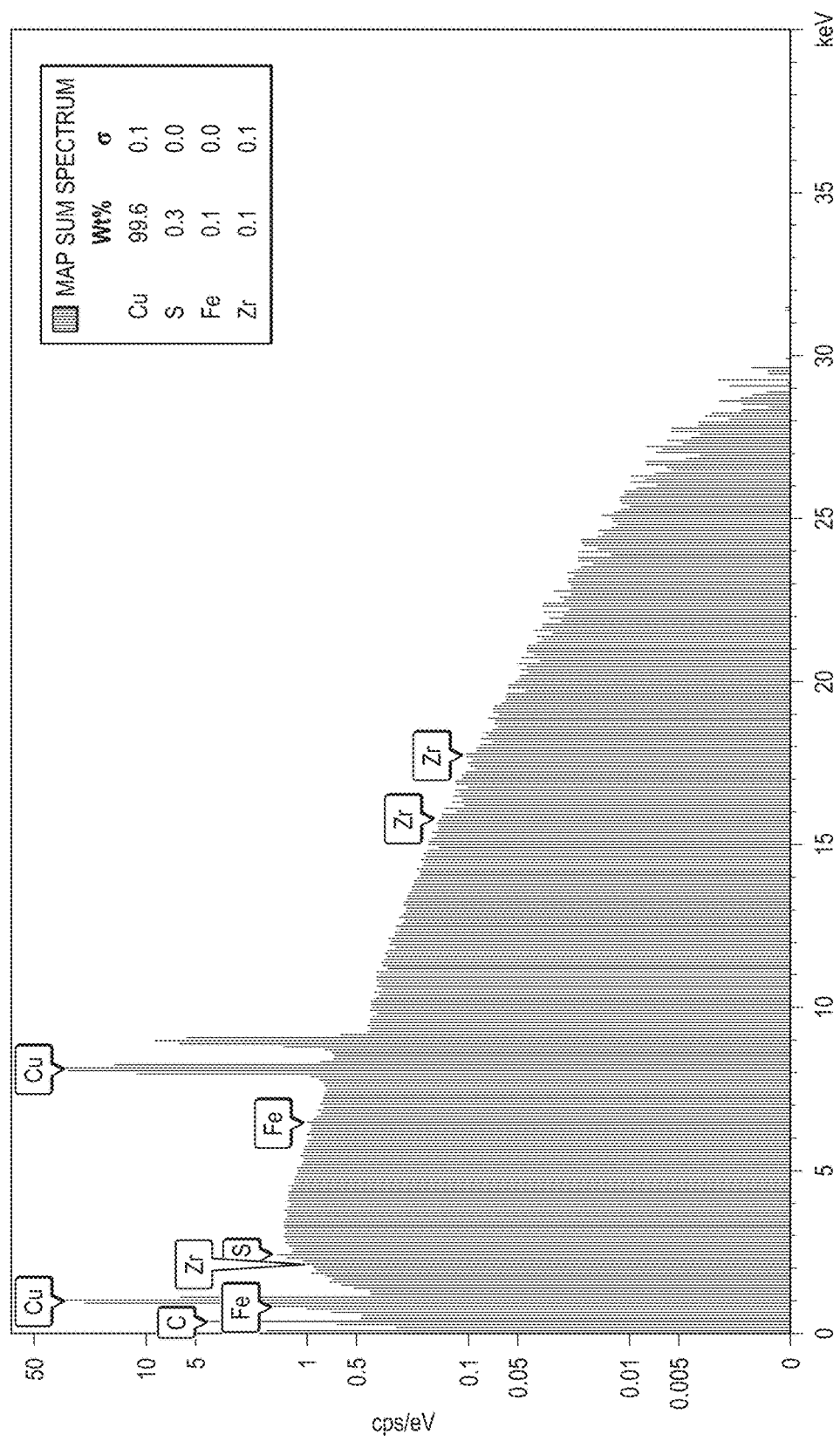

FIGS. 20A-20D illustrates the Energy Dispersive X-rays Spectroscopy (EDX) (FIG. 20A and FIG. 20C) and Scanning Electron Microscopy (SEM) photographs (FIG. 20B and FIG. 20D) from Experiment B after drop coating (FIG. 20A and FIG. 20B) and after growth (FIG. 20C and FIG. 20D).

Experiment C

The synthetic asphaltene precursor had no metals inside of it so since there are no metals present after growth. Thus, it can be confirmed that this method ONLY applies to aslphaltenes with native metals present. This was done to confirm that metals were not coming from anywhere else and being deposited onto the graphene during growth.

Figure 21A:
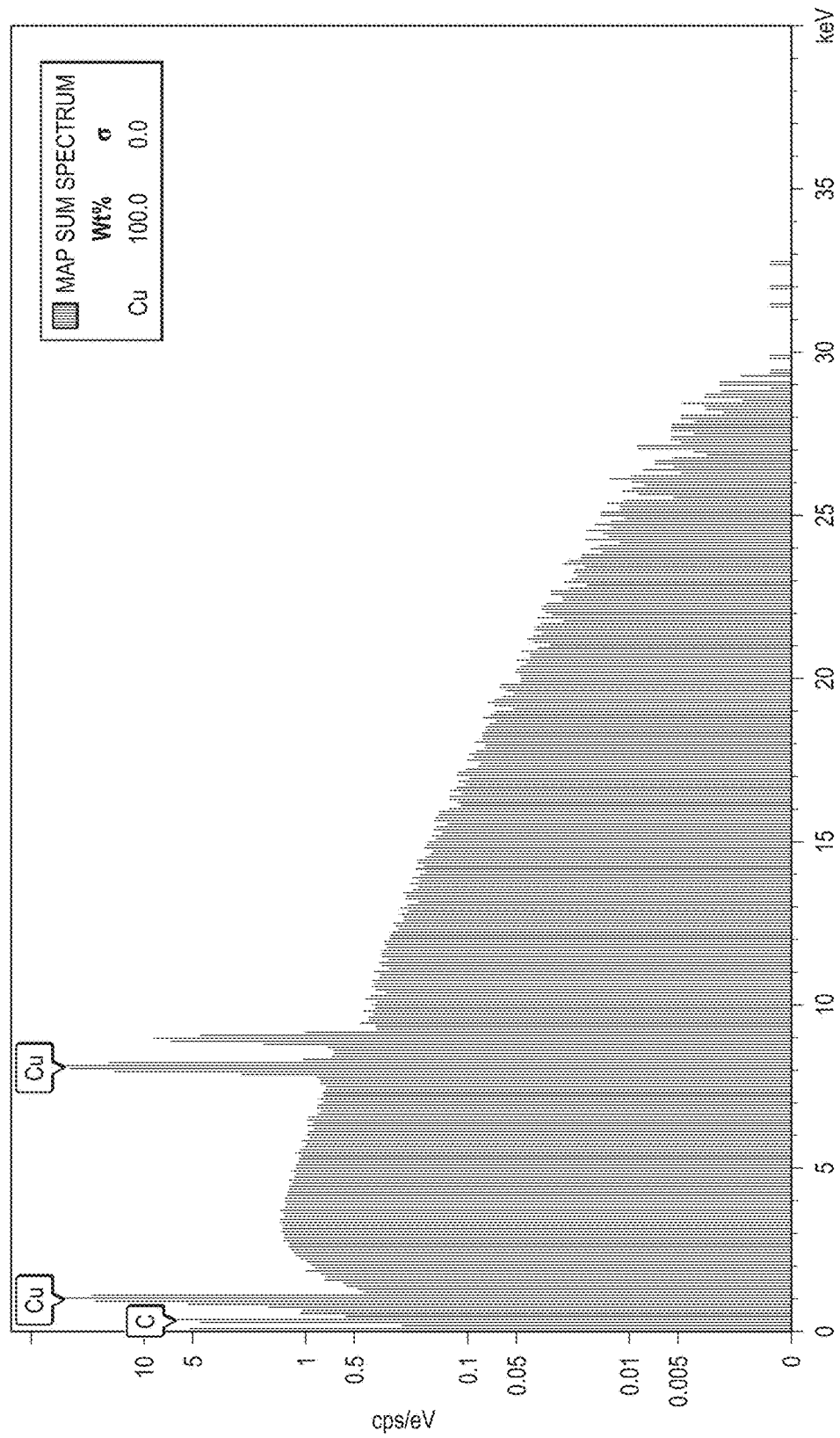
FIGS. 21A-21B illustrates the EDX (FIG. 21A) and SEM (FIG. 21B) from pregrowth drop coated synthetic asphaltene in Experiment C.
Figure 21B:

FIGS. 21A-21B illustrates the EDX (FIG. 21A) and SEM (FIG. 21B) from pregrowth drop coated synthetic asphaltene in Experiment C.

To further study asphaltene adatoms, EDX was taken of a synthetic asphaltene containing no metals. FIGS. 21A and 21B show that synthetic asphaltene contained no metals or adatoms after being deposited. Needless to say, from data in FIGS. 21A and 21B, no TM or adatoms were found to be present after growth.

Optical Microscope (OM):

Pictures taken using OM show copper coated with C7 asphaltenes before and after growth. There are clustered discotic structures before growth and curiously there are areas after growth that show clearly more than a few layers graphitized. There are areas that can be seen where copper can be seen as clear orange from underneath sheets of graphitized carbon in FIGS. 22C and 22D.

Figure 22B:
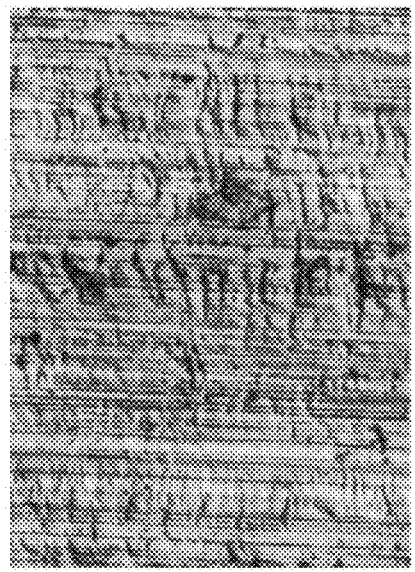
FIGS. 22A-22D are a composite of the optical microscope images of C7 asphaltene on copper foil from experiment A before (FIG. 22A-22B) and after growth (FIG. 22C-22D)
Figure 22D:
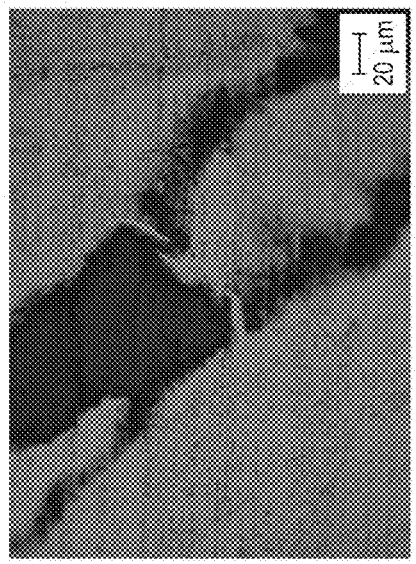
Figure 22A:
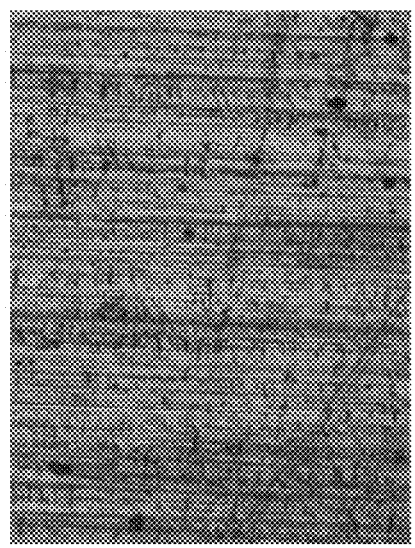
Figure 22C:
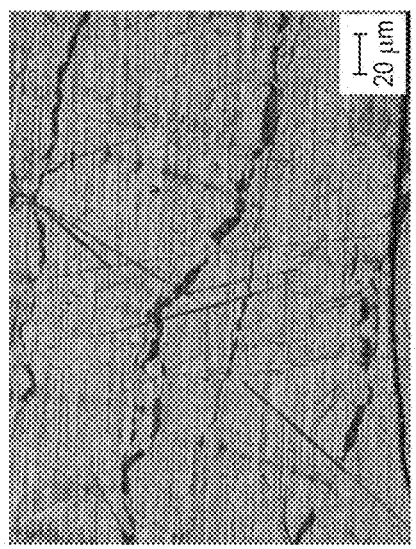
Figure 23A:
FIGS. 23A-23D are a composite of the optical microscope images of post growth C7 asphaltene (FIG. 23A-23B) and Raman analysis of D (FIG. 23C) and G peaks (FIG. 23D) from experiment A.
Figure 23C:
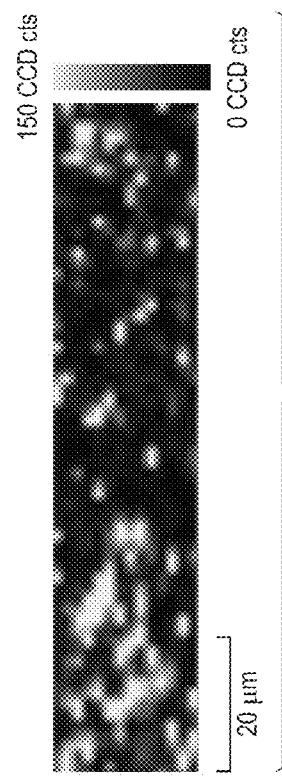
Figure 23B:
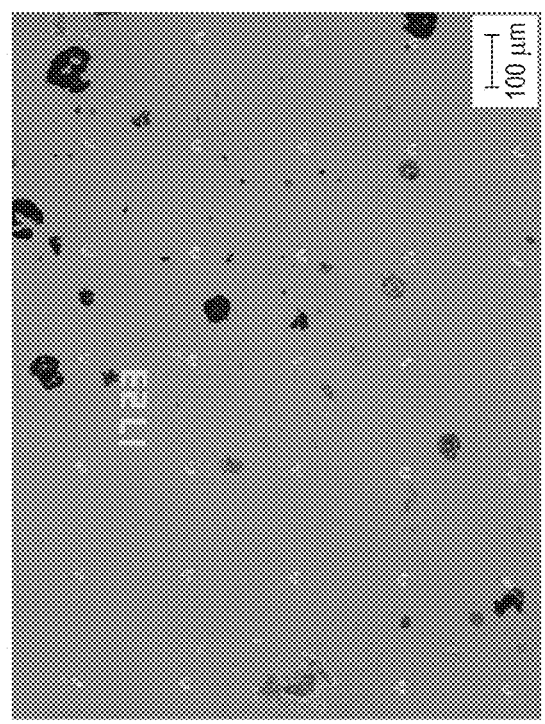
Figure 23D:
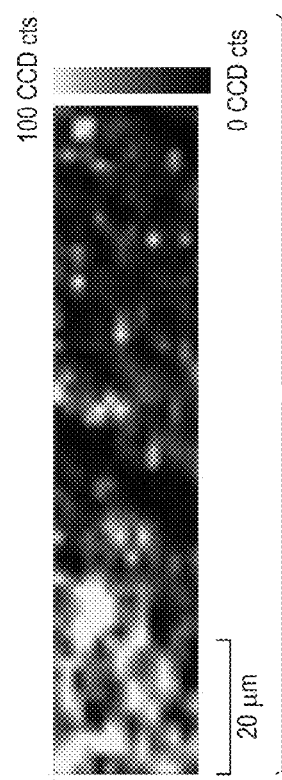

FIGS. 22A-22D are a composite of the optical microscope images of C7 asphaltene on copper foil from experiment A before (FIG. 22A-22B) and after growth (FIG. 22C-22D).

FIGS. 23A-23D are a composite of the optical microscope images of post growth C7 asphaltene (FIG. 23A-23B) and Raman analysis of D (FIG. 23C) and G peaks (FIG. 23D) from Experiment A.

Figure 24:
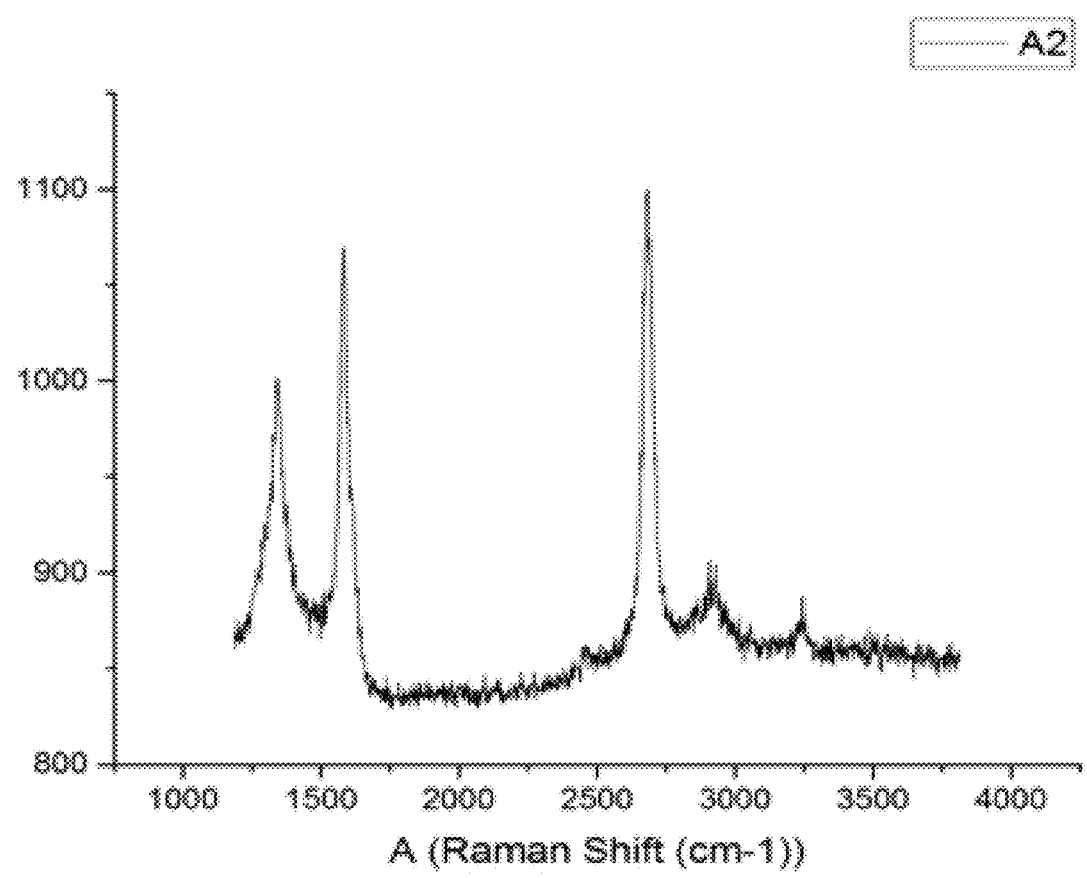
FIG. 24 is the Raman spectra of C7 post growth asphaltene across averaged area from experiment A.

FIG. 24 is the Raman spectra of C7 post growth asphaltene across averaged area from Experiment A.

Figure 25B:
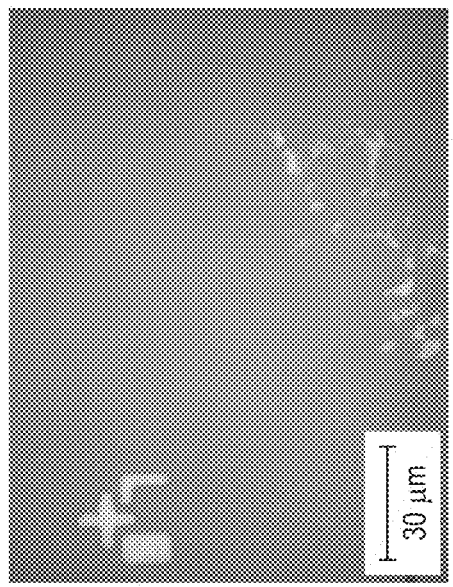
FIGS. 25A-25C are a composite of the optical microscope images of local areas investigated by Raman (FIG. 25A-25B) and corresponding local raman analysis (FIG. 25C) from experiment A.
Figure 25A:
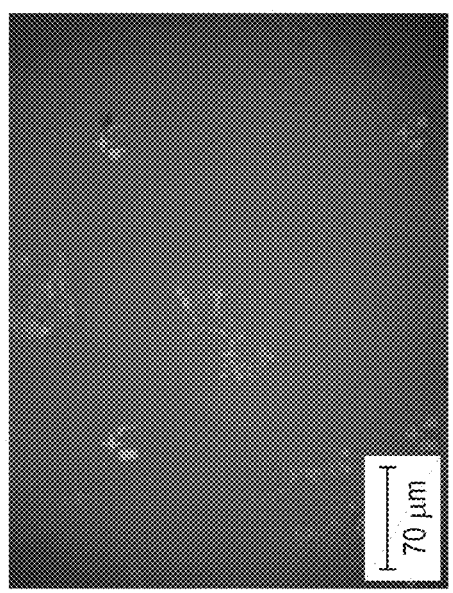
Figure 25C:
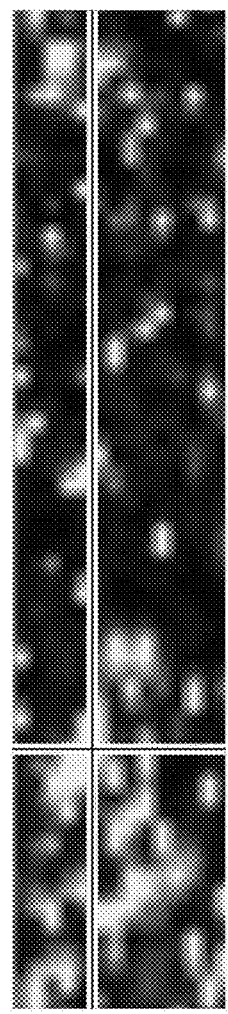

FIGS. 25A-25C are a composite of the optical microscope images of local areas investigated by Raman (FIG. 25A-25B) and corresponding local raman analysis (FIG. 25C) from Experiment A.

Figure 26:
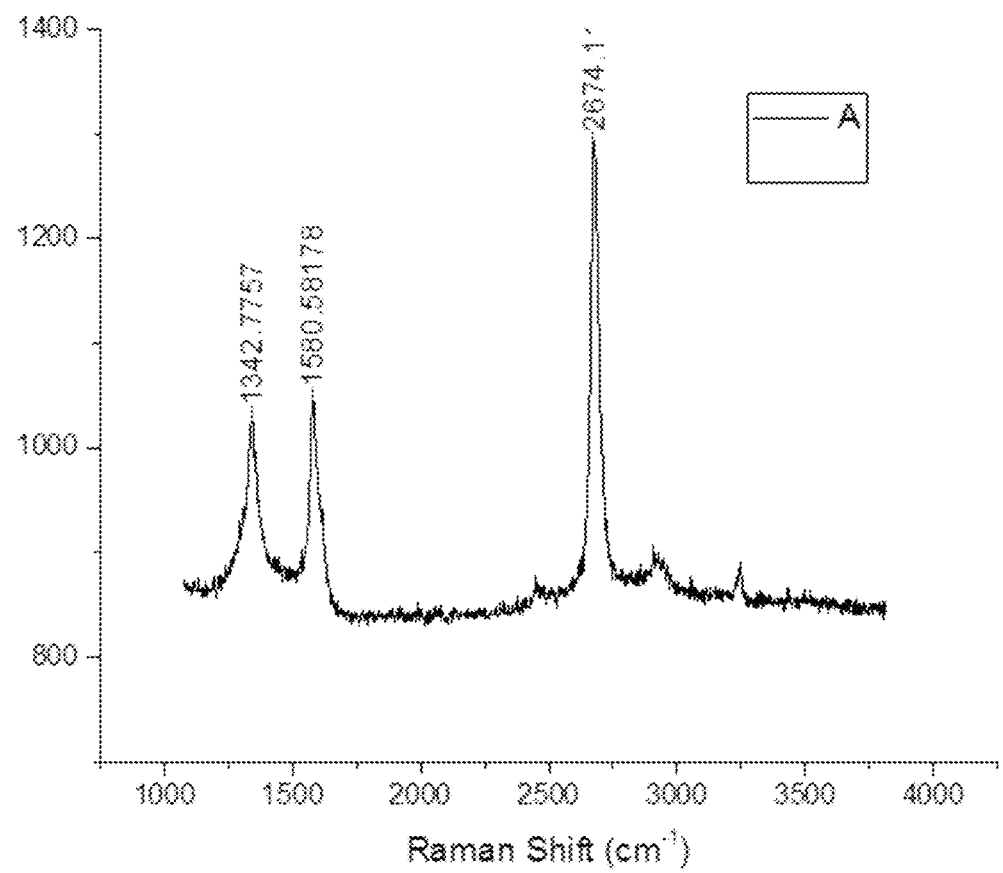
FIG. 26 is the Raman analysis of local image from FIG. 11C, FIGS. 27A-27H are a composite of the Raman from all experiment areas transferred to Si02/Si.
Figure 27A:
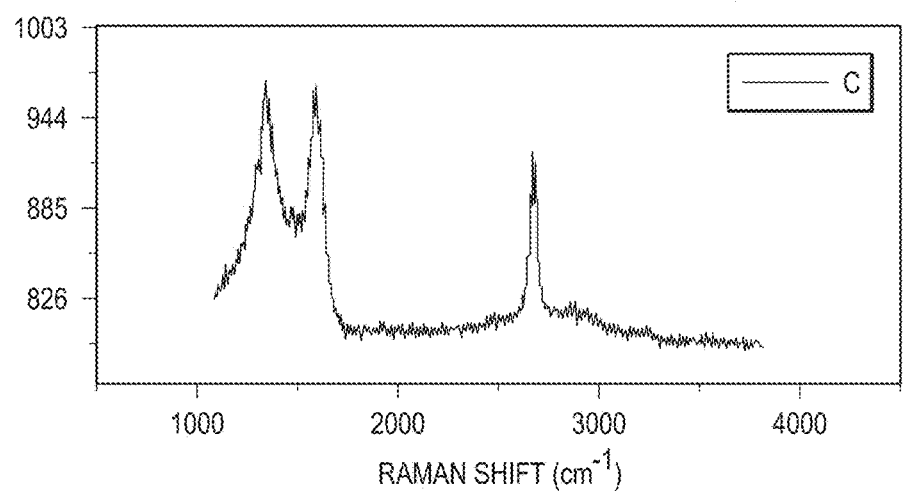
Figure 27B:
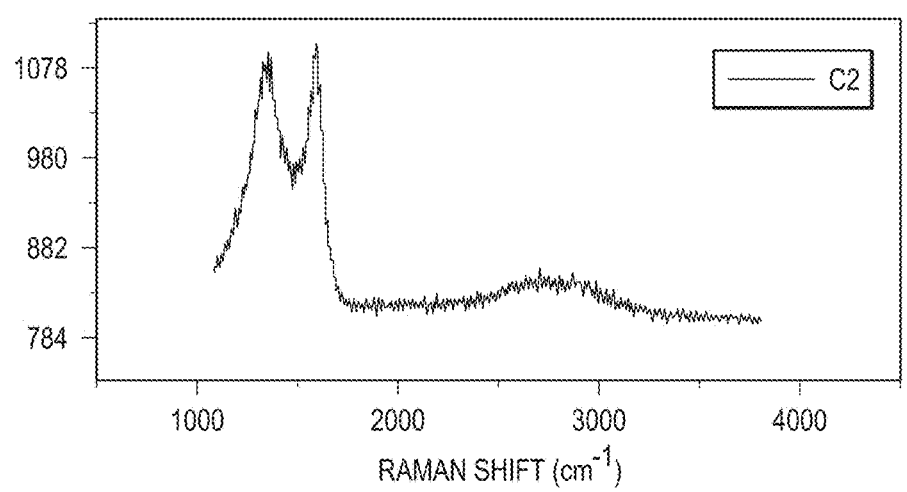
Figure 27C:
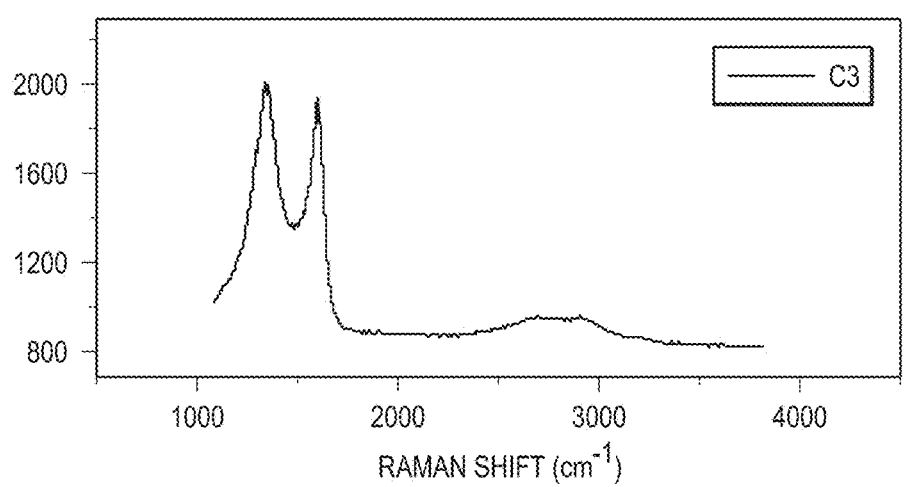
Figure 27D:
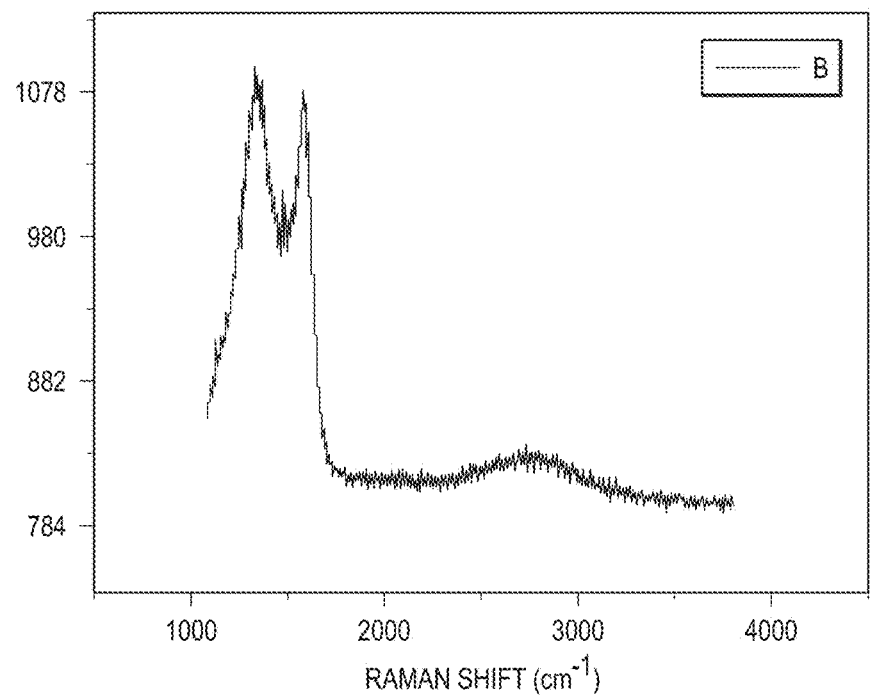
Figure 27E:
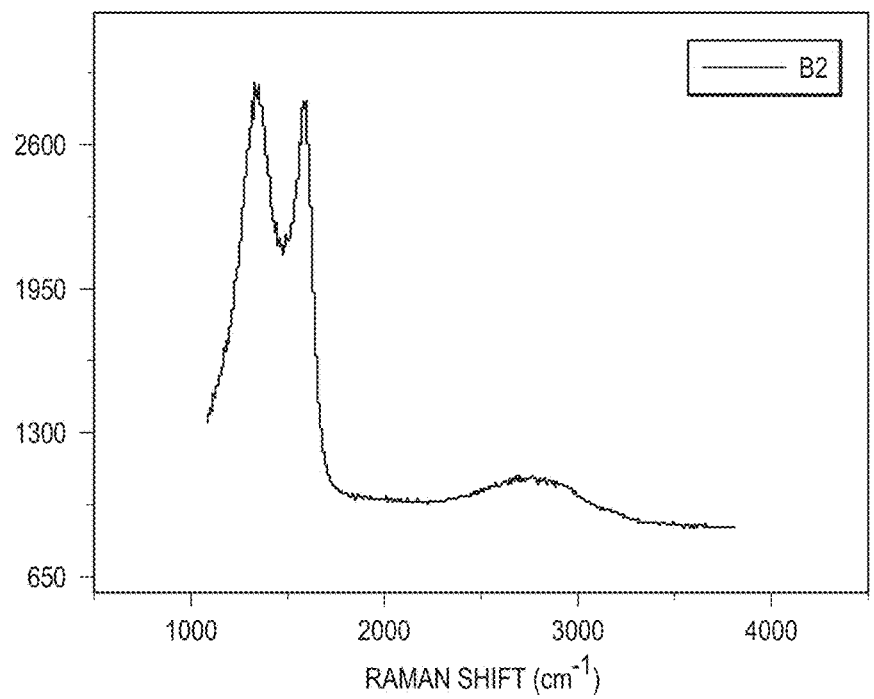
Figure 27F:
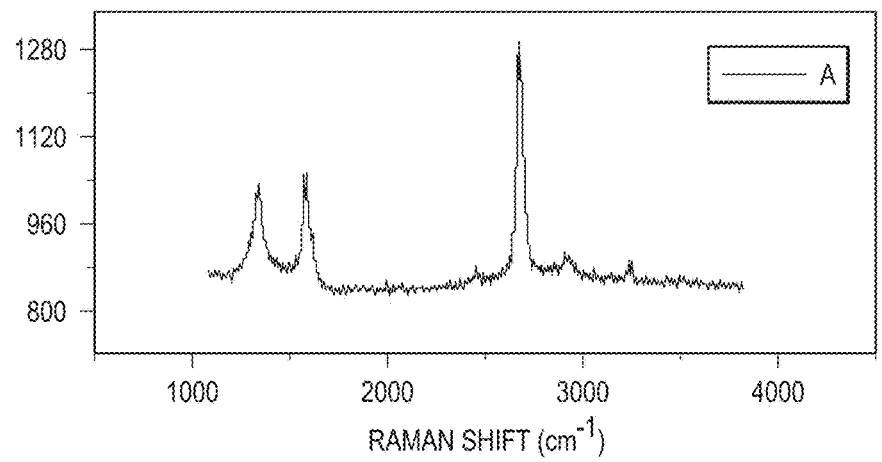
Figure 27G:
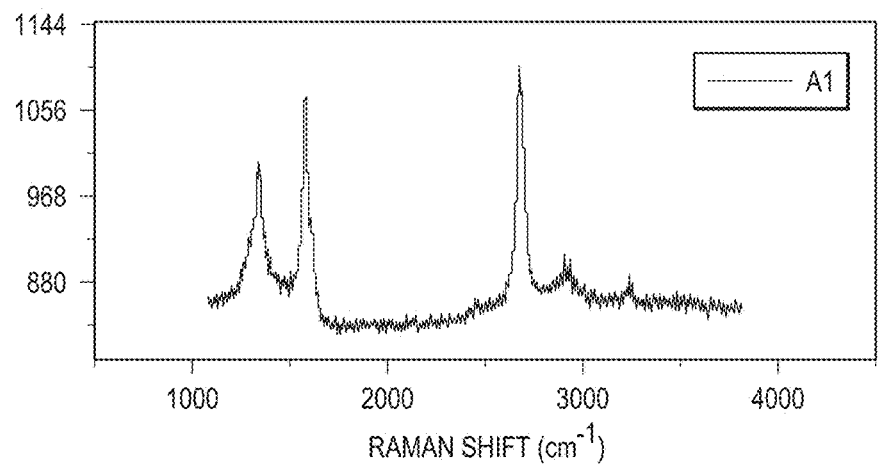
Figure 27H:
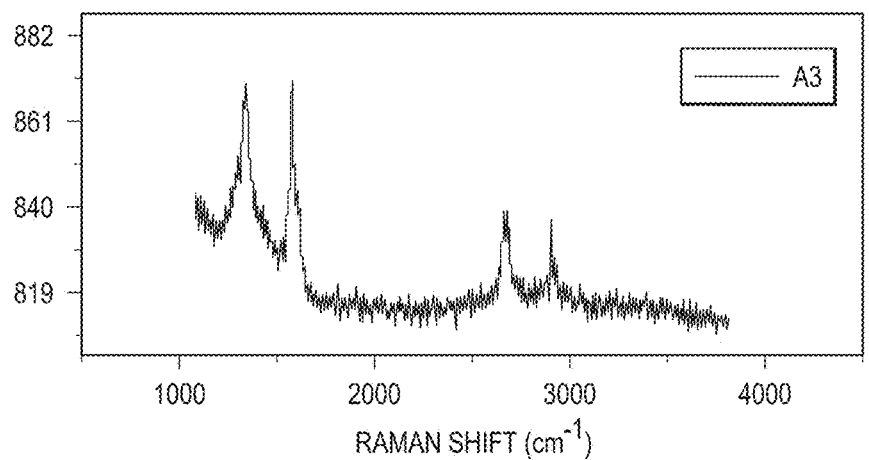

FIG. 26 is the Raman analysis of local image from FIG. 11C.

FIGS. 27A-27H are a composite of the Raman from all experiment areas transferred to Si02/Si.

Figure 28:
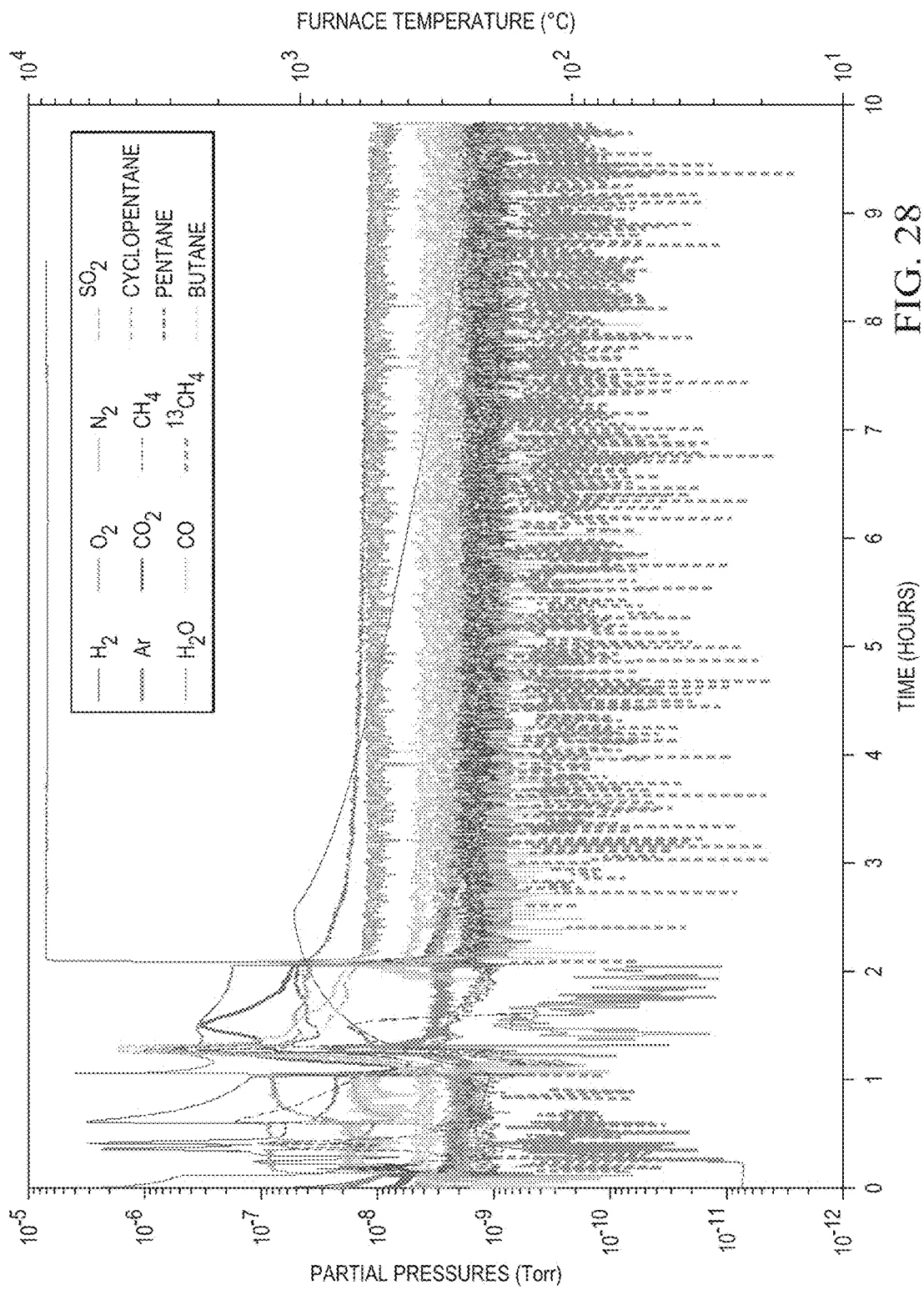
FIG. 28 is the Residual Gas Analysis (RGA) data of Experiment A.

FIG. 28 is the Residual Gas Analysis (RGA) data of Experiment A.

Figure 29:
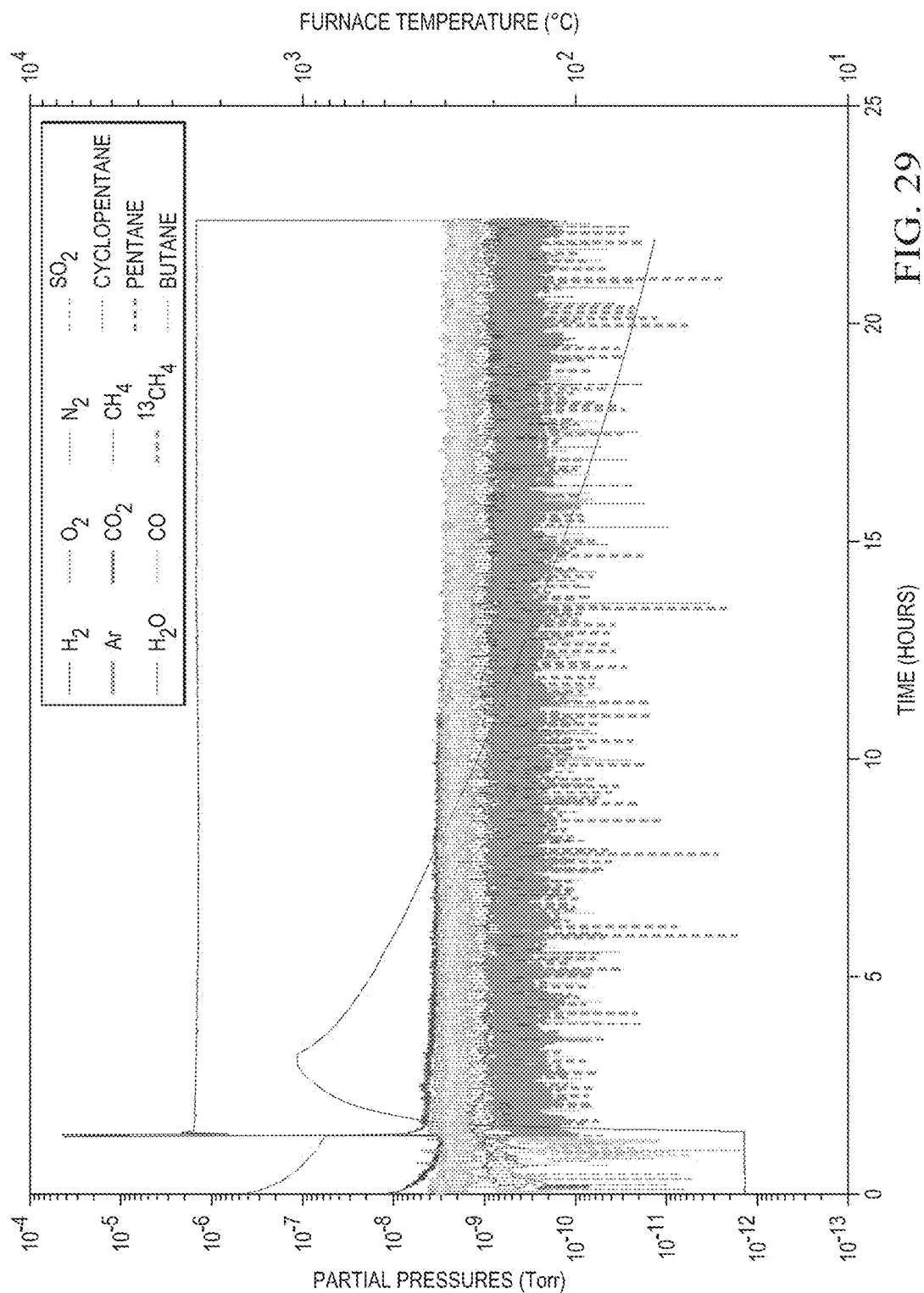
FIG. 29 is the RGA data from Experiment B.

FIG. 29 is the RGA data from Experiment B.

Figure 30:
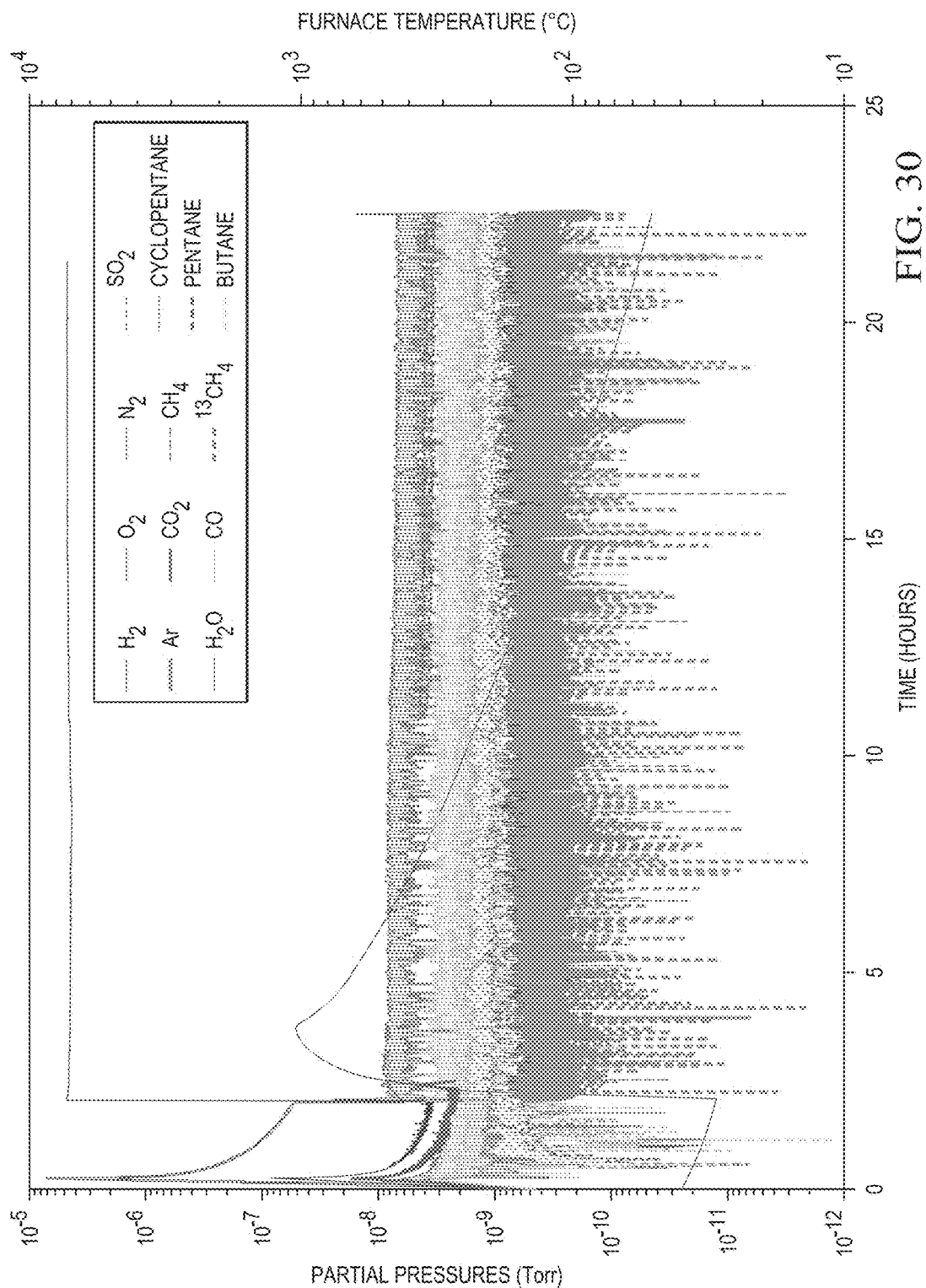
FIG. 30 is the RGA data from Experiment C.

FIG. 30 is the RGA data from Experiment C.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method of making a metal-doped graphene comprising:
    preparing a metal-containing asphaltene thin film on a metal catalyst substrate; and
    heating the metal-containing asphaltene thin film/catalyst at 400° C. to 1050° C. and at pressures of $1\times10^{-3}$ Torr to 1500 Torr forming a planar metal-doped graphene; and
    separating the planar metal-doped graphene from the metal catalyst.

2. The method of claim 1, wherein separating the planar metal-doped graphene from the metal catalyst is by etching or lifting.

3. The method of claim 1, wherein the catalyst comprises one or more metal selected from Cu, Mo, Zn, Cd, Ti, Ni, V, Fe, Mn, Cr and Co.

4. The method of claim 1, wherein the asphaltene thin film is heated under an $H_2/Ar$ gas flow.

5. The method of claim 1, wherein the asphaltene thin film is heated in a tube furnace.

* * * * *